(12) United States Patent
Huynh

(10) Patent No.: US 11,287,836 B2
(45) Date of Patent: Mar. 29, 2022

(54) SYSTEMS, METHODS, AND APPARATUS TO CONTROL AIRCRAFT ROLL OPERATIONS

(71) Applicant: The Boeing Company, Chicago, IL (US)

(72) Inventor: Neal Van Huynh, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 223 days.

(21) Appl. No.: 16/786,260

(22) Filed: Feb. 10, 2020

(65) Prior Publication Data
US 2021/0247779 A1 Aug. 12, 2021

(51) Int. Cl.
| | |
|---|---|
| *G05D 1/00* | (2006.01) |
| *G05D 1/08* | (2006.01) |
| *B64C 9/00* | (2006.01) |
| *B64C 13/04* | (2006.01) |
| *B64C 13/18* | (2006.01) |
| *B64C 13/50* | (2006.01) |
| *B64C 9/32* | (2006.01) |

(Continued)

(52) U.S. Cl.
CPC .......... *G05D 1/0808* (2013.01); *B64C 9/00* (2013.01); *B64C 9/32* (2013.01); *B64C 13/00* (2013.01); *B64C 13/0423* (2018.01); *B64C 13/18* (2013.01); *B64C 13/30* (2013.01); *B64C 13/50* (2013.01); *B64C 2009/005* (2013.01)

(58) Field of Classification Search
CPC ..... B64C 25/405; B64C 25/42; B64C 25/426; B64C 9/32; B64C 13/00; B64C 13/0423; B64C 13/16; B64C 13/18; B64C 13/30; B64C 13/34; B64C 13/50; B64C 2009/005; B64C 25/36; B64C 25/505; B64C 9/00; B64C 9/12; B64C 9/323; B64C 13/0425; B64C 13/40; B64C 21/04; B64C 21/08; B64C 2230/04; B64C 2230/06; B64C 2230/16; B64C 25/423; B64C 29/005; B64C 3/58; B64C 37/00; B64C 9/04; B64C 9/20; B64C 9/22; B64C 9/24; G05D 1/0202; G05D 1/0077; G05D 1/0808; G05D 1/0083; B60L 2200/26; B60L 53/12; B60L 7/10
See application file for complete search history.

(56) References Cited

U.S. PATENT DOCUMENTS

2019/0176966 A1* 6/2019 Eddy .................... B64C 13/504

* cited by examiner

*Primary Examiner* — Ian Jen
(74) *Attorney, Agent, or Firm* — Hanley, Flight & Zimmerman LLC

(57) ABSTRACT

Systems, methods, and apparatus to control aircraft roll operations are disclosed herein. An example system includes a control wheel position determiner to determine a control wheel position based on an input from a control wheel of the aircraft, a control wheel force determiner to determine a first control wheel force based on a sensor measurement, and a spoiler controller to map the control wheel position to a second control wheel force, the second control wheel force based on nominal characteristics of the aircraft, determine a first difference between the first control wheel force and the second control wheel force, and in response to determining that the first difference does not satisfy a threshold, move a flight control surface based on a third control wheel force, the third control wheel force based on a second difference between the first difference and the threshold.

21 Claims, 15 Drawing Sheets

(51) Int. Cl.
*B64C 13/00* (2006.01)
*B64C 13/30* (2006.01)

US 11,287,836 B2

SYSTEMS, METHODS, AND APPARATUS TO CONTROL AIRCRAFT ROLL OPERATIONS

FIELD OF THE DISCLOSURE

This disclosure relates generally to aircraft and, more particularly, to systems, methods, and apparatus to control aircraft roll operations.

BACKGROUND

In recent years, larger aircraft wing designs with increased aerodynamic performance have led to improved aircraft payload capacity and longer flight range. Such aircraft wing designs can allow an aircraft to adjust flight control surfaces, such as spoilers and ailerons, to control roll operations during flight and achieve improved performance. However, larger aircraft wing designs can cause increased difficulty for a pilot exercising manual control.

SUMMARY

Systems, methods, and apparatus to control aircraft roll operations are disclosed herein.

An example system disclosed herein includes a control wheel position determiner to determine a control wheel position based on an input from a control wheel of the aircraft, a control wheel force determiner to determine a first control wheel force based on a sensor measurement, and a spoiler controller to map the control wheel position to a second control wheel force, the second control wheel force based on nominal characteristics of the aircraft, determine a first difference between the first control wheel force and the second control wheel force, and, in response to determining that the first difference does not satisfy a threshold, move a flight control surface based on a third control wheel force, the third control wheel force based on a second difference between the first difference and the threshold.

An example non-transitory computer readable storage medium disclosed herein includes instructions that, when executed, cause at least one processor to determine a control wheel position based on an input from a control wheel of an aircraft determine a first control wheel force based on a sensor measurement, map the control wheel position to a second control wheel force, the second control wheel force based on nominal characteristics of the aircraft, determine a first difference between the first control wheel force and the second control wheel force, and, in response to determining that the first difference does not satisfy a threshold, move a flight control surface based on a third control wheel force, the third control wheel force based on a second difference between the first difference and the threshold.

An example method disclosed herein includes determining a control wheel position based on an input from a control wheel of the aircraft, determining a first control wheel force based on a sensor measurement, mapping the control wheel position to a second control wheel force, the second control wheel force based on nominal characteristics of the aircraft, determining a first difference between the first control wheel force and the second control wheel force, and, in response to determining that the first difference does not satisfy a threshold, moving a flight control surface based on a third control wheel force, the third control wheel force based on a second difference between the first difference and the threshold.

Figure 1:
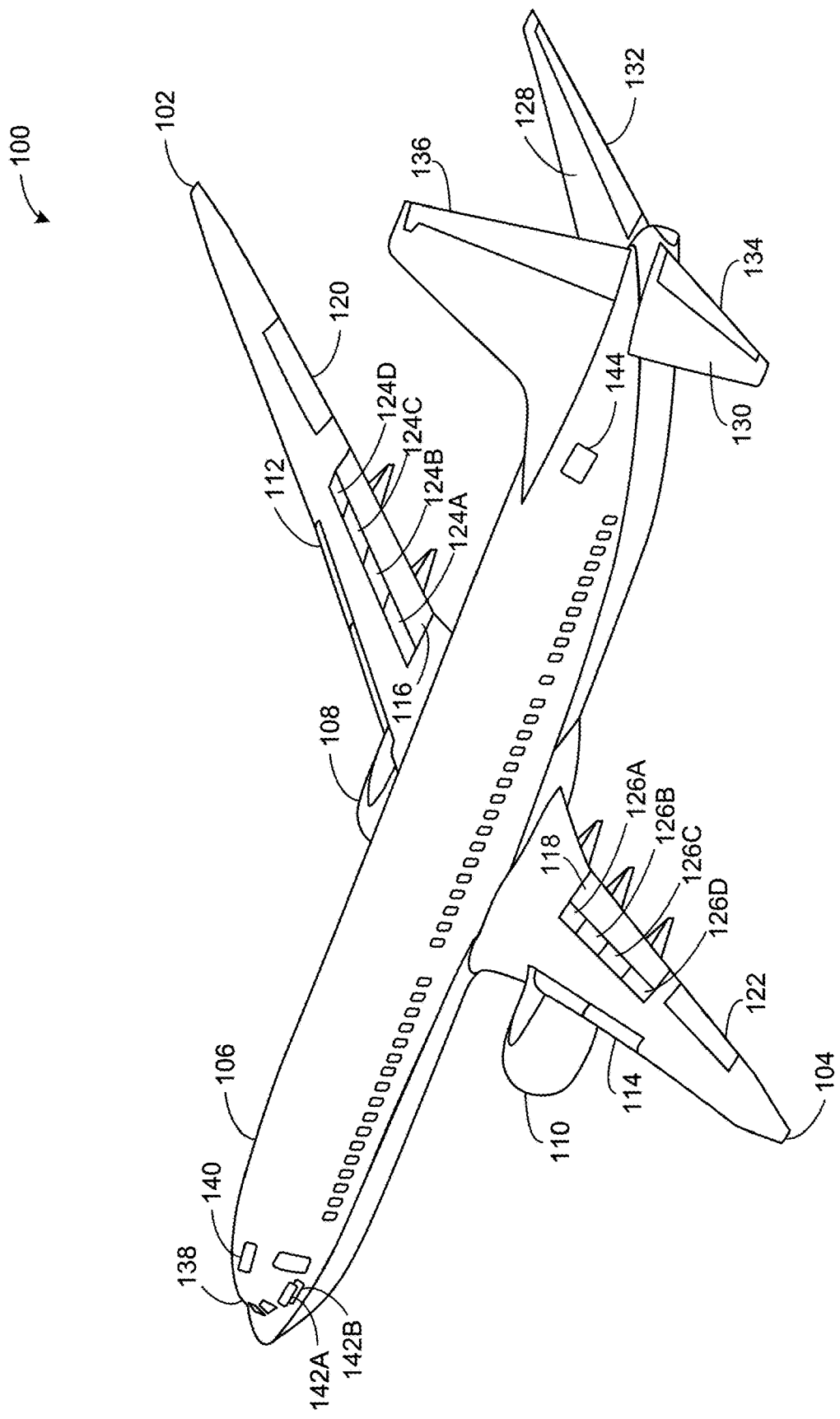
FIG. 1 illustrates an example aircraft that may implement the examples disclosed herein.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In recent years, aircraft manufacturers have invested in aircraft designs to reduce fuel consumption by improving aerodynamic performance of commercial aircraft. Accordingly, the modern air transportation industry has moved towards designs of larger and/or improved aerodynamic performance aircraft. Improved aerodynamic performance allows for increased payload capacity and longer ranges of flight, thereby increasing commercial aircraft efficiency.

Development of entirely new planes to improve aircraft performance is often costly and time intensive. An alternative approach can be to add larger, more aerodynamic wings to current aircraft models. Such wings may include one or more flight control surfaces (e.g., an aileron, a spoiler, a slat, a flap, etc.) to facilitate flight of the aircraft by controlling the pitch, roll, yaw, etc., of the aircraft.

Ailerons are flight control surfaces that are typically located on a trailing edge of an aircraft wing and are used in pairs to control roll operations of the aircraft. Actuation of the ailerons results in roll, or movement about a longitudinal axis of the aircraft, and/or, more generally, a change in a flight path of the aircraft. Additionally or alternatively with the ailerons, spoilers can be used in roll operations. Typically, spoilers are located on a top surface of the aircraft wing and can extend in an upward direction to affect airflow above the aircraft wing. In some instances, spoilers create a controlled stall by greatly reducing lift of a section of the aircraft wing while increasing drag of the section, which can facilitate a controlled aircraft descent and/or roll operation.

Typical commercial aircraft are fly-by-wire (FBW), which can refer to conventional manual flight controls being replaced with an electrical interface. Movement of the manual flight controls can be converted to electrical signals and transmitted by electrical conductors to one or more controllers, such as a flight control computer (FCC). The FCC can generate commands to control actuators coupled to flight control surfaces that are associated with the electrical signals from the manual flight controls to execute intended operation(s). The actuators can be powered by hydraulic power and/or electrical power. As described herein, a hybrid system (e.g., a hybrid power system) can refer to a power distribution system including hydraulic power, electrical power, and/or manual power associated with pilot input at a control wheel to provide power to and/or otherwise control the actuators to control the flight control surfaces.

In response to hydraulics not functioning properly, redundant control (e.g., backup control) options can be used to operate the aircraft. To improve aircraft control, redundant power sources can be used to control electrical system(s) in response to one of the power sources not responding to a command. In some instances, electrical actuators can be used in response to the primary hydraulic system(s) not responding to a command. The electrical actuators can control the actuators that control the flight control surfaces. In hybrid systems, manual controls can be used to control aircraft movement by controlling the actuators.

Examples disclosed herein include an example aircraft roll operation control system to control aircraft roll operations by controlling flight control surfaces to perform aircraft operations such as pitch, roll, yaw, etc. The example aircraft roll operation control system includes an example FCC and an example spoiler control electronic (SCE) controller to control the flight control surfaces. For example, when a pilot changes a position of a control wheel, sensor(s) can determine control wheel pilot inputs and transmit the control wheel inputs to at least one of the FCC or the SCE controller. The example FCC and/or the example SCE controller can generate commands based on the control wheel inputs to control actuators that are coupled to different actuators, cables, flight control surfaces, etc., and/or a combination thereof.

In some disclosed examples, the aircraft roll control operation system includes hydraulic systems and corresponding actuators on both sides of the aircraft to improve redundancy. In some disclosed examples, in response to at least one hydraulic system being non-responsive and/or exhibiting low pressure, an example electric actuator can be used to control the actuators that are coupled to the hydraulic actuators, cables, flight control surfaces, etc. The example electric actuator can be powered by an example alternate power unit (APU) or any other secondary power source. In some examples, the electric actuator and/or the APU can be invoked regardless of a status of the hydraulic system(s).

In some disclosed examples, the aircraft roll control operation system controls aircraft roll operations based on autopilot commands. The example FCC and/or the example SCE controller can generate the autopilot commands based on flight control parameters to control actuators and/or corresponding flight control surfaces to execute changes in aircraft movement. For example, the FCC and/or the SCE controller operating in an autopilot control mode can generate commands based on flight control parameters without the control wheel pilot inputs from the pilot. In some disclosed examples, the pilot(s) experience feedback when autopilot is engaged and/or otherwise operating through a body run cable that is coupled (e.g., directly coupled) to the control wheel(s). For example, actuator(s) coupled to the body run cable can be actuated when autopilot is engaged to actuate the body run cable that, in turn, back-drives the control wheel(s) to provide physical and/or visual feedback to the pilot. In such examples, the back-driven forces rotate the control wheels that, in turn, allow position sensors to determine a control wheel position to be used for controlling spoiler actuators.

In some disclosed examples, the aircraft roll operation control system controls aircraft roll operations based on a backup control mode. For example, in response to both hydraulic systems being inoperable and/or malfunctioning, the control wheel pilot inputs and actuator position sensors are processed by redundant electronics (e.g., SCE controller and/or one or more FCC) to control the operation of the ailerons. In such examples, flight command(s) are provided by the SCE controller, which controls the electric actuator and actuates the aileron actuators, to control the ailerons. In such examples, the electric actuator is powered by the APU and the SCE controller can generate control commands to the electric actuator, where the control commands can be based on the control wheel position.

In some disclosed examples, the aircraft roll operation control system counteracts a mechanical jam (e.g., a mechanical control jam) associated with one or more flight control surfaces. For example, the FCC and/or the SCE controller can determine whether a mechanical control jam is present in connection with one or more ailerons, one or more spoilers, etc., and/or a combination thereof. In response to determining that a mechanical control jam is present, the FCC and/or the SCE controller can determine a control wheel force and a control wheel position based on control wheel pilot inputs from one or more sensors.

In some disclosed examples, the SCE controller maps the control wheel position to a nominal response and a maximum allowable response to determine a nominal force value and a maximum allowable force value. In such examples, the nominal and maximum allowable responses are stored in a look-up table included in an SCE database. In such examples, the SCE controller can use the look-up table based on aircraft characteristics (e.g., components and/or component configurations) to determine whether a mechanical control jam is present by comparing (1) a first difference between the nominal force and the control wheel force to (2) a second difference between the nominal force and a maximum allowable force. For example, the SCE controller can determine that a mechanical control jam is present based on a difference between the first difference and the second difference satisfying a threshold.

FIG. 1 is a schematic illustration of an example aircraft 100. The aircraft 100 includes example wings 102, 104 coupled to an example fuselage 106. The wings 102, 104 include a first example wing 102 on a first side of the aircraft 100 and a second example wing 104 on a second side of the aircraft 100, where the first side is opposite the second side. Example engines 108, 110 are coupled to the wings 102, 104. The engines 108, 110 include a first example engine 108 coupled to the first wing 102 and a second example engine 110 coupled to the second wing 104.

In FIG. 1, the aircraft 100 includes example slats 112, 114, example flaps 116, 118, example ailerons 120, 122, and example spoilers 124A-D, 126A-D, operatively coupled to the wings 102, 104. The slats 112, 114 include a first example slat 112 operatively coupled to the first wing 102 and a second example slat 114 operatively coupled to the second wing 104. The ailerons 120, 122 include a first example aileron 120 operatively coupled to the first wing 102 and a second example aileron 122 operatively coupled to the second wing 104. The spoilers 124A-D, 126A-D include a first example spoiler 124A, a second example spoiler 124B, a third example spoiler 124C, and a fourth example spoiler 124D operatively coupled to the first wing 102. The spoilers 124A-D, 126A-D include a first example spoiler 126A, a second example spoiler 126B, a third example spoiler 126C, and a fourth example spoiler 124D operatively coupled to the second wing 104.

Additional control surfaces of the aircraft 100 include example horizontal stabilizers 128, 130 operatively coupled to example elevators 132, 134 and an example vertical stabilizer 136 coupled to the fuselage 106. The horizontal stabilizers 128, 130 include a first example horizontal stabilizer 128 on the first side of the aircraft 100 and a second example horizontal stabilizer 130 on the second side of the aircraft 100. The elevators 132, 134 include a first example elevator 132 operatively coupled to the first horizontal stabilizer 128 and a second example elevator 134 operatively coupled to the second horizontal stabilizer 130.

In the illustrated example of FIG. 1, the aircraft 100 includes an example spoiler control electronic (SCE) controller 140 to obtain control wheel sensor data and/or control one or more flight control surfaces of the aircraft 100. Alternatively, the aircraft 100 may include more than one of the SCE controller 140. For example, the aircraft 100 can include more than one of the SCE controller 140 when spoiler actuation is to be controlled. In FIG. 1, the SCE controller 140 is located proximate an example cockpit 138 of the aircraft 100. For example, the SCE controller 140 can be in the cockpit 138 and/or, more generally, in front of the engines 108, 110. Alternatively, one or more of the SCE controller 140 may be located elsewhere in the aircraft 100 than depicted in FIG. 1.

In the illustrated example of FIG. 1, the aircraft 100 includes a first example flight control computer (FCC) 142A and a second example flight control computer (FCC) 142B to obtain control wheel sensor data and/or control one or more flight control surfaces of the aircraft 100. In examples disclosed herein, the first FCC 142A and the second FCC 142B are redundant computers, processor platforms, etc., and can perform the same or substantially similar computer-executable operations, functions, etc. In examples disclosed herein, any description in connection with one instance of the FCC 142A-B can correspondingly apply to another instance of the FCC 142A-B. For example, description in connection with the first FCC 142A can be applicable to the second FCC 142B. In FIG. 1, the FCC 142A-B are located proximate the cockpit 138. For example, the FCC 142A-B can be in the cockpit 138 and/or, more generally, in front of the engines 108, 110. Alternatively, one or more of the FCC 142A-B may be located elsewhere in the aircraft 100.

In the illustrated example of FIG. 1, the aircraft 100 includes an example alternate power unit (APU) 144 to provide power (e.g., backup power) to actuators operatively coupled to one or more flight control surfaces when a pilot of the aircraft 100 assumes a backup control mode. For example, the APU 144 can be a gas turbine, a (relatively) small jet engine, etc. Alternatively, the aircraft 100 may include more than one APU 144. In FIG. 1, the APU 144 is located in a rear portion or section (e.g., a tail cone) of the aircraft 100. For example, the APU 144 can be behind the wings 102, 104. Alternatively, the APU 144 may be located elsewhere in the aircraft 100.

Figure 2:
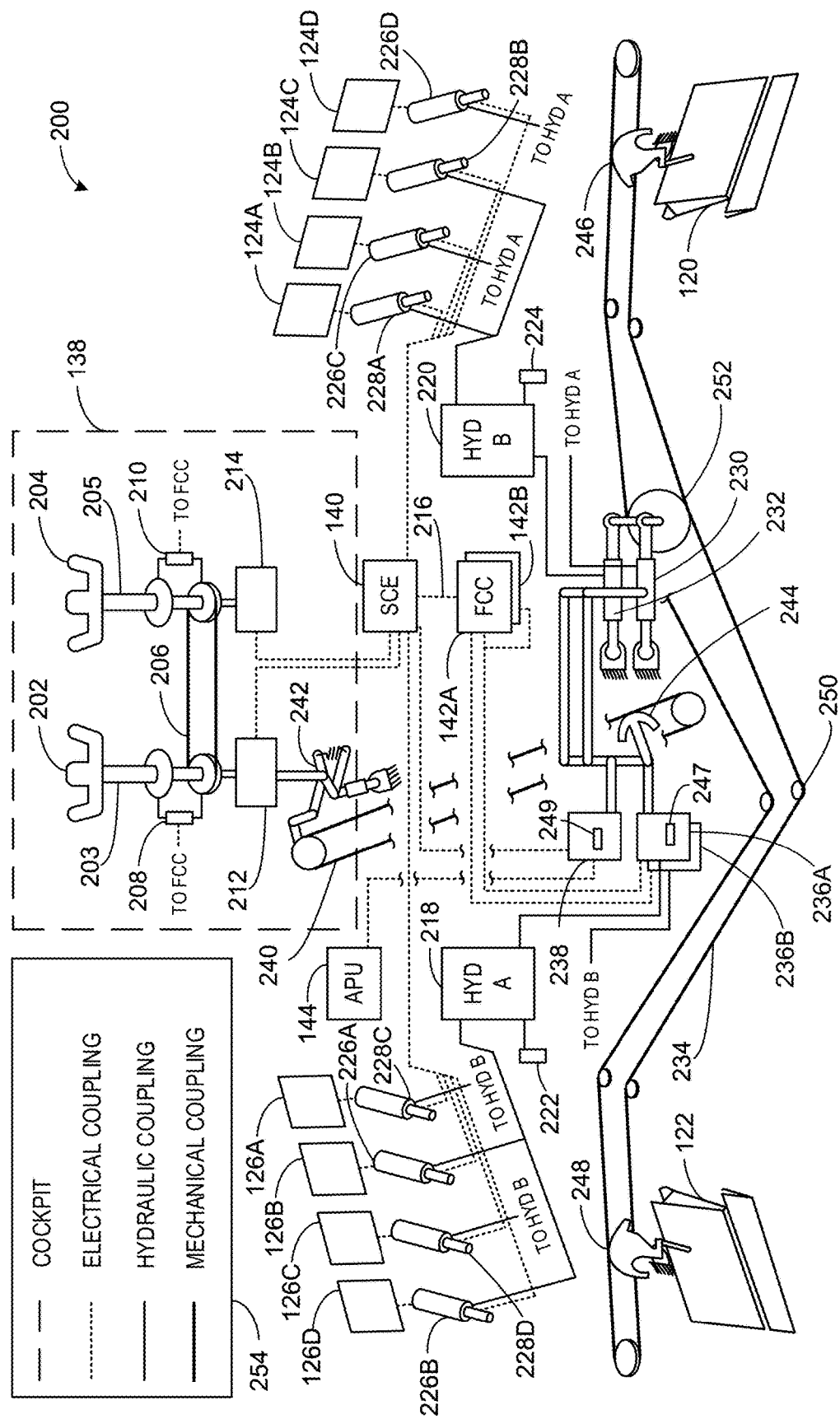
FIG. 2 depicts an example implementation of an aircraft roll operation control system.

FIG. 2 depicts an example aircraft roll operation control system 200 included in the aircraft 100 of FIG. 1. The aircraft roll operation control system 200 facilitates roll operations of the aircraft 100 by controlling the ailerons 120, 122 of FIG. 1, the spoilers 124A-D, 126A-D of FIG. 1, etc., and/or a combination thereof using a hybrid system. For example, the aircraft roll operation control system 200 can control the ailerons 120, 122 while the FCC 142A-B of FIG. 1 is operating in a mode. In some examples, the FCC 142A-B can operate and/or otherwise facilitate control of one or more flight control surfaces and/or, more generally, the aircraft 100 of FIG. 1 in an example autopilot control mode, an example normal control mode, or an example backup control mode. In some examples, the aircraft roll operation control system 200 controls the spoilers 124A-D, 126A-D while the SCE controller 140 of FIG. 1 is operating in the autopilot control mode, the normal control mode, or an example force control mode.

In the illustrated example of FIG. 2, the aircraft roll operation control system 200 includes components in the cockpit 138 of FIG. 1 to facilitate aircraft roll operations. In FIG. 2, the cockpit 138 includes example control wheels 202, 204, example shafts 203, 205, an example bus cable 206, example force sensors 208, 210, example wheel position sensors 212, 214, and an example feel-and-centering (FAC) device 242.

In the illustrated example of FIG. 2, the aircraft roll operation control system 200 includes the control wheels 202, 204 to translate an input from a pilot to control the flight control surfaces of FIG. 1. In FIG. 2, the control wheels 202, 204 include a first example control wheel 202 having a first example shaft 203 and a second example control wheel 204 having a second example shaft 205. In FIG. 2, the first control wheel 202 is operatively coupled to the bus cable 206 via the first shaft 203 and the second example control wheel 204 is operatively coupled to the bus cable 206 via the second shaft 205. For example, in response to a pilot turning the first control wheel 202, the first shaft 203 can proportionally turn to control motion of the bus cable 206. Advantageously, by coupling the control wheels 202, 204 to the bus cable 206, either of the control wheels 202, 204 can control the FAC device 242.

In the illustrated example of FIG. 2, the aircraft roll operation control system 200 includes the force sensors 208, 210 to measure a force applied to and/or otherwise associated with the control wheels 202, 204. In FIG. 2, the force sensors 208, 210 include a first example force sensor 208 and a second example force sensor 210. In FIG. 2, the force sensors 208, 210 are force transducers. Alternatively, one or both of the force sensors 208, 210 may be torque sensors or other force sensing devices.

In the illustrated example of FIG. 2, the aircraft roll operation control system 200 includes the wheel position sensors 212, 214 to measure a position of the control wheels 202, 204. In FIG. 2, the wheel position sensors 212, 214 include a first example wheel position sensor 212 and a second example wheel position sensor 214. In FIG. 2, the first wheel position sensor 212 is coupled to the first shaft 203 of the first control wheel 202. In FIG. 2, the second wheel position sensor 214 is coupled to the second shaft 205 of the second control wheel 204. For example, the wheel position sensors 212, 214 can measure an angle of rotation, a position difference with respect to an origin or other reference angle, etc., of the control wheels 202, 204. In FIG. 2, the wheel position sensors 212, 214 may be implemented using linear or rotary variable displacement transformer sensors. Alternatively, one or both of the wheel position sensors 212, 214 may be resolvers, potentiometers, or other position sensing devices.

In the illustrated example of FIG. 2, the aircraft roll operation control system 200 includes the FAC device 242 to provide rising control forces to the pilot as a deterrent to excessive maneuvering of the aircraft 100. For example, the FAC device 242 can prevent the control wheels 202, 204 from drifting away from a centered or otherwise pre-defined position when the control wheels 202, 204 are not desired or meant to be rotated. In FIG. 2, the FAC device 242 corresponds to one or more mechanical linkages to translate and/or otherwise provide feedback from an example body run cable 240 to the pilot at the control wheels 202, 204. In FIG. 2, the FAC device 242 is operatively coupled to the control wheels 202, 204 via the shafts 203, 205. In FIG. 2, the FAC device 242 is operatively coupled to the body run cable 240.

In the illustrated example of FIG. 2, the aircraft roll operation control system 200 includes the SCE controller 140 to obtain wheel position sensor data from the wheel position sensors 212, 214 and/or control one or more of the aircraft flight control surfaces of FIG. 1. In FIG. 2, the SCE controller 140 is coupled to the wheel position sensors 212, 214, example spoiler actuators 226A-D, 228A-D, an example electric actuator 238, and the FCC 142A-B. For example, the SCE controller 140 can generate commands based on the obtained wheel position sensor data and/or force sensor data, the force sensor data received from the FCC 142A-B, to control one or more of the spoiler actuators 226A-D, 228A-D and/or the electric actuator 238.

In some examples, the SCE controller 140 and the FCC 142A-B communicate via an example data bus 216. The data bus 216 provides a communication medium or interface for the SCE controller 140 and the FCC 142A-B to transfer wheel position sensor data, actuator position data, and/or other data (e.g., force sensing data from the force sensors 208, 210) to determine commands to control flight control surfaces of the aircraft 100.

The data bus 216 of FIG. 2 is a bus and/or a computer network. For example, the data bus 216 may be an internal controller bus, an aircraft control network, etc. For example, the aircraft control network may utilize one or more communication protocols based on Aeronautical Radio, Incorporated (ARINC) specifications (e.g., ARINC 425, ARINC 629, ARINC 664, ARINC 1553, etc.). The data bus 216 of FIG. 2 can be implemented using any suitable wired and/or wireless network(s) including, for example, one or more data buses, one or more Local Area Networks (LANs), one or more wireless LANs (WLANs), one or more fiber optic networks, etc.

In the illustrated example of FIG. 2, the aircraft roll operation control system 200 includes the FCC 142A-B to obtain force sensor data and/or control the flight control surfaces of FIG. 1. In FIG. 2, the FCC 142A-B is coupled to the SCE controller 140, the force sensors 208, 210, and example autopilot actuators 236A, 236B. For example, the FCC 142A-B can generate commands based on example flight parameters (e.g., autopilot flight parameters, aircraft data, flight data, etc.) 450 to control the autopilot actuators 236A, 236B. In such examples, the FCC 142A-B generates autopilot commands to control the autopilot actuators 236A, 236B without and/or otherwise not based on wheel position sensor data.

In the illustrated example of FIG. 2, the aircraft roll operation control system 200 includes a first example hydraulic system (HYD A) 218 and a second example hydraulic system (HYD B) 220 to provide flow of hydraulic fluid at pressure to actuators throughout the aircraft roll operation control system 200. In FIG. 2, the hydraulic systems 218, 220 are coupled to the spoiler actuators 226A-D, 228A-D, the autopilot actuators 236A, 236B, example pressure sensors 222, 224, and example aileron actuators 230, 232. While the hydraulic systems 218, 220 are shown as single components in the illustrated example of FIG. 2, the hydraulic systems 218, 220 can be implemented by any number and/or type of components, sub-systems, etc., such as hydraulic pumps, reservoirs, accumulators, heat exchangers, filters, etc.

The illustrated example aircraft roll operation control system 200 of FIG. 2 includes the pressure sensors 222, 224 to measure, sense, and/or otherwise determine pressure (e.g., hydraulic pressure) at different locations, positions, etc., of the hydraulic systems 218, 220. In FIG. 2, the pressure sensors 222, 224 include a first example pressure sensor 222 and a second example pressure sensor 224. In FIG. 2, the first pressure sensor 222 measures a first pressure associated with the first hydraulic system 218. In FIG. 2, the second pressure sensor 224 measures a second pressure associated with the second hydraulic system 220. In FIG. 2, the pressure sensors 222, 224 are piezoresistive strain gauges. Alternatively, one or both of the pressure sensors 222, 224 may be electromagnetic pressure sensors or other pressure sensing devices.

In the illustrated example of FIG. 2, the aircraft roll operation control system 200 includes first example spoiler actuators 226A-D and second example spoiler actuators 228A-D to control the actuation of the spoilers 124A-D, 126A-D of FIG. 1. In FIG. 2, the spoiler actuators 226A-D, 228A-D are coupled to the spoilers 124A-D, 126A-D, the SCE controller 140, and at least one of the hydraulic systems 218, 220. The spoiler actuators 226A-D, 228A-D are coupled (e.g., communicatively coupled) to the SCE controller 140 to facilitate the transmission of flight control commands from the SCE controller 140 to the spoiler actuators 226A-D, 228A-D.

In the illustrated example of FIG. 2, the first spoiler actuators 226A-D are coupled to the first hydraulic system 218. In FIG. 2, the first spoiler actuators 226A-D include a first example spoiler actuator 226A, a second example spoiler actuator 226B, a third example spoiler actuator 226C, and a fourth example spoiler actuator 226D. In FIG. 2, the first spoiler actuator 226A controls the second spoiler 126B of the second wing 104 of FIG. 1, the second spoiler actuator 226B controls the fourth spoiler 126D of the second wing 104, the third spoiler actuator 226C controls the second spoiler 124B of the first wing 102, and the fourth spoiler actuator 226D controls the fourth spoiler 124D of the first wing 102.

In the illustrated example of FIG. 2, the second spoiler actuators 228A-D are coupled to the second hydraulic system 220. In FIG. 2, the second spoiler actuators 228A-D include a fifth example spoiler actuator 228A, a sixth example spoiler actuator 228B, a seventh example spoiler actuator 228C, and an eighth example spoiler actuator 228D. In FIG. 2, the fifth spoiler actuator 228A controls the first spoiler 124A of the first wing 102, the sixth spoiler actuator 228B controls the third spoiler 124C of the first wing 102, the seventh spoiler actuator 228C controls the first spoiler 126A of the second wing 104, and the eighth spoiler actuator 228D controls the third spoiler 126C of the second wing 104.

The hydraulic systems 218, 220 transmit hydraulic fluid at pressure to the spoiler actuators 226A-D, 228A-D to control the spoilers 124A-D, 126A-D. In FIG. 2, the spoiler actuators 226A-D, 228A-D are hydraulic cylinder actuators. Alternatively, one or both of the spoiler actuators 226A-D, 228A-D may be hydraulic motors or hydraulic rotary actuators.

In the illustrated example of FIG. 2, the aircraft roll operation control system 200 includes a first example autopilot actuator 236A and a second example autopilot actuator 236B to control the actuation of the aileron actuators 230, 232. The autopilot actuators 236A, 236B are coupled (e.g., communicatively coupled) to the FCC 142A-B to facilitate the transmission of flight control commands from the FCC 142A-B to the autopilot actuators 236A, 236B. The first autopilot actuator 236A is coupled to the first hydraulic system 218 and the second autopilot actuator 236B is coupled to the second hydraulic system 220. The hydraulic systems 218, 220 transmit hydraulic fluid at pressure to the autopilot actuators 236A, 236B to control the aileron actuators 230, 232. The first autopilot actuator 236A is hydraulically and/or otherwise operatively coupled to the first example aileron actuator 230 and the second autopilot actuator 236B is hydraulically and/or otherwise operatively coupled to the second example aileron actuator 232. In FIG. 2, the autopilot actuators 236A, 236B are hydraulic cylinder actuators. Alternatively, one or both of the autopilot actuators 236A, 236B may be hydraulic motors, hydraulic rotary actuators, or any other type of actuator.

The example aircraft roll operation control system 200 of FIG. 2 includes the electric actuator 238 to actuate the aileron actuators 230, 232 in response to both hydraulic systems 218, 220 being inoperable. The electric actuator 238 is powered by the APU 144 and controlled by the SCE controller 140 based on the control wheel position. The electric actuator 238 is operatively coupled to the aileron actuators 230, 232 and can be used to control the aileron actuators 230, 232 that control the ailerons 120, 122 when either both hydraulic systems 218, 220 are inoperable and/or malfunctioning or during a Power-Up Built-in Test (PBIT). The PBIT is performed when the aircraft 100 is in a parked position. In either one of these two system conditions, the electric actuator 238 can actuate the valve stops located in the aileron actuators 230, 232 that, in turn, control the ailerons 120, 122. In FIG. 2, the electric actuator 238 is a linear reversing and/or bidirectional motor (e.g., a geared motor) but could alternatively be a unidirectional motor, a rotary motor, or any other type of actuator.

In the illustrated example of FIG. 2, the autopilot actuators 236A, 236B include a first actuator position sensor 247 and the electric actuator 238 includes a second actuator position sensor 249. For example, the actuator position sensors 247, 249 can be coupled to the SCE controller 140 and/or the FCC 142A-B and measure the position(s) of the autopilot actuators 236A, 236B and/or the electric actuator 238. In some examples, the SCE controller 140 and/or the FCC 142A-B compare position data obtained by the actuator position sensors 247, 249 to the control wheel position to determine whether a mechanical control jam is present within the aircraft roll operation control system 200.

In the illustrated example of FIG. 2, the aircraft roll operation control system 200 includes the APU 144 to provide power to the electric actuator 238. The APU 144 is coupled (e.g., communicatively coupled, electrically coupled, etc.) to the SCE controller 140 and can power the electric actuator 238 when the hydraulic systems 218, 220 are inoperable. In other examples, the APU 144 is invoked to power the electric actuator 238 during a PBIT to control the aileron actuators 230, 232. In such examples, the PBIT test ensures that the system components remain capable of controlling the ailerons when both hydraulic systems are inoperable and/or malfunctioning.

The example aircraft roll operation control system 200 of FIG. 2 includes the body run cable 240 to transfer energy from one or both of the control wheels 202, 204 to the aileron actuators 230, 232. In some examples, the transfer of energy can come from the aileron actuators 230, 232, through the body run cable 240, to control the FAC device 242 and back-drive the control wheels 202, 204 to provide visual feedback to the pilots that the autopilot commands are operating the aircraft roll operation control system 200. In such examples, when the aircraft 100 is operating in autopilot control mode, the spoiler actuators 226A-D, 228A-D can be controlled by the SCE controller 140 based on the back-driven control wheel position. In FIG. 2, the body run cable 240 is coupled to the aileron actuators 230, 232 through an example body run coupling device 244. In FIG. 2, the body run cable 240 is a cable (e.g., a flexible steel cable) that can correspond to a plurality of different fittings, turnbuckles, linkages, etc., to connect and/or otherwise couple to other components to facilitate cable adjustments. The body run coupling device 244 is a mechanical connection or linkage between the body run cable 240 and the aileron actuators 230, 232 that enables the transfer of mechanical energy in either direction between the body run cable 240 and the aileron actuators 230, 232.

The example aircraft roll operation control system 200 of FIG. 2 includes the first aileron actuator 230 and the second aileron actuator 232 to interact with an example wing cable 234 to control the aircraft ailerons 120, 122. In FIG. 2, the first aileron actuator 230 is coupled to the first hydraulic system 218 and the second aileron actuator 232 is coupled to the second hydraulic system 220. The hydraulic systems 218, 220 transmit hydraulic fluid at pressure to the aileron actuators 230, 232 to control the aircraft ailerons 120, 122. In FIG. 2, the aileron actuators 230, 232 are operatively coupled to the wing cable 234 via a first example pulley 250. In FIG. 2, the aileron actuators 230, 232 are hydraulic rotary actuators. Alternatively, one or both aileron actuators 230, 232 may be hydraulic cylinder actuators, hydraulic motors, or any other type of actuator.

In the illustrated example of FIG. 2, the aircraft roll operation control system 200 includes a plurality of second example pulleys 252 that are coupled to the wing cable 234 in a plurality of locations to allow the wing cable 234 to be routed throughout the aircraft 100 while maintaining the ability to translate freely as the second pulleys 252 rotate. While FIG. 2 only depicts eight of the second pulleys 252, fewer or more pulleys than depicted in FIG. 2 can be used.

The example aircraft roll operation control system 200 of FIG. 2 includes the wing cable 234 to transfer translational and/or rotational energy from the aileron actuators 230, 232 to example aileron linkages 246, 248 that are coupled to the ailerons 120, 122. In FIG. 2, the aileron linkages include a first example aileron linkages 246 coupled to the first aileron 120 of FIG. 1 and a second example aileron linkages 248 coupled to the second aileron 122 of FIG. 1. The wing cable 234 allows the aileron actuators 230, 232 to control both ailerons 120, 122 with one actuation. In FIG. 2, the wing cable 234 is a cable (e.g., a flexible carbon steel cable) that can correspond to a plurality of different fittings, turnbuckles, linkages, etc., and/or a combination thereof to connect and/or otherwise couple to other components to facilitate cable adjustments or changes in cable position.

In the illustrated example of FIG. 2, the aircraft roll operation control system 200 includes the aileron linkages 246, 248 to couple the wing cable 234 to the ailerons 120, 122. The aileron linkages 246, 248 convert translational movement from the wing cable 324 into rotational movement to control an angle of respective ones of the ailerons 120, 122. In FIG. 2, the aileron linkages 246, 248 are mechanical linkages that enable the conversion and transfer of energy from the wing cable 234 to the ailerons 120, 122.

The illustrated example aircraft roll operation control system 200 of FIG. 2 includes a plurality of line weights and line types that correspond to locational references and/or types of couplings between objects and/or parts within the system. In FIG. 2, an example aircraft roll operation control system legend 254 depicts a line weight and line type that corresponds to the locational reference or type of coupling depicted in the illustrated example of FIG. 2. For example, the electrical coupling can correspond to a communication data bus, an electrical power connection, etc., and/or a combination thereof.

Figure 3:
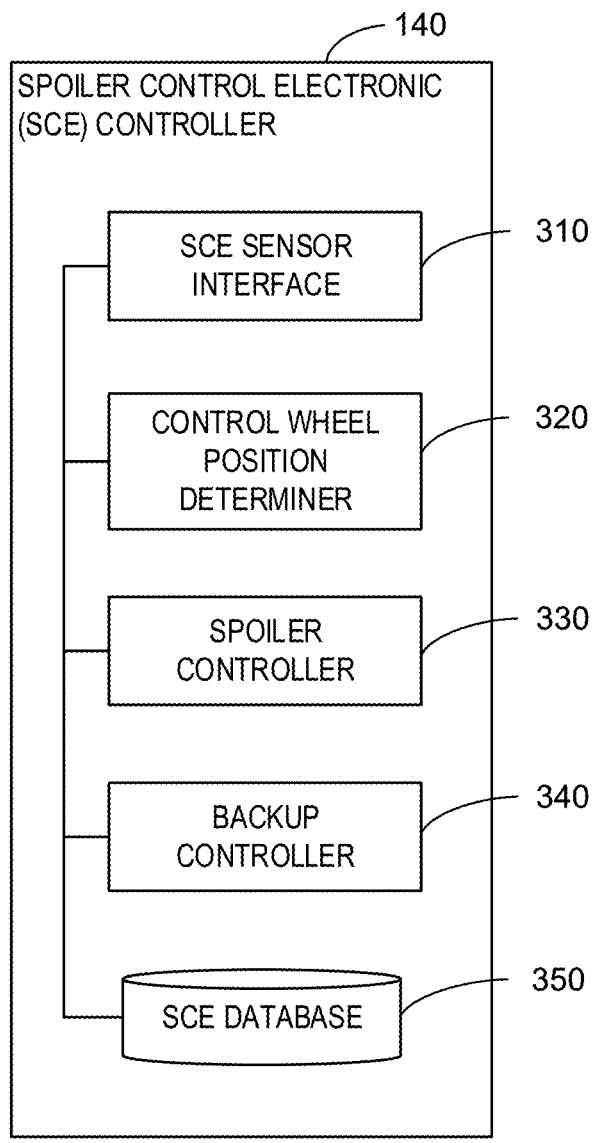
FIG. 3 is a block diagram of an example implementation of a spoiler control electronic (SCE) controller of the aircraft roll operation control system of FIG. 2.

FIG. 3 is a block diagram of an example implementation of the SCE controller 140 of FIGS. 1 and/or 2 to control the spoilers 124A-D, 126A-D and/or the ailerons 120, 122 of FIGS. 1 and/or 2. In the illustrated example of FIG. 3, the SCE controller 140 includes an example SCE sensor interface 310, an example control wheel position determiner 320, an example spoiler controller 330, an example backup controller 340, and an example SCE database 350.

In the illustrated example of FIG. 3, the SCE controller 140 includes the SCE sensor interface 310 to facilitate communication with sensors of the aircraft roll operation control system 200 of FIG. 2. For example, the SCE sensor interface 310 can obtain sensor data, sensor measurements, etc., from the APU 144 (e.g., an APU measurement corresponding to an APU voltage or APU current), the force sensors 208, 210 (e.g., a force measurement or value), the wheel position sensors 212, 214 (e.g., a wheel position sensor measurement corresponding to a wheel position or wheel position value, a control wheel position or control wheel position value, etc.), the actuator position sensors 247, 249 (e.g., actuator position measurement or value), and/or the pressure sensors 222, 224 (e.g., a pressure measurement or value). In such examples, the SCE sensor interface 310 can convert electrical signals from the sensors to a machine readable format. For example, the SCE sensor interface 310 can convert analog sensor signals into digital values (e.g., binary values, hexadecimal values, etc.). In other examples, the SCE sensor interface 310 can communicate with the APU 144, the sensors, etc., via a communication protocol (e.g., ARINC 425, ARINC 629, ARINC 664, ARINC 1553, etc.) and translate data from the APU 144, the sensors, etc., in the communication protocol to digital values or other machine readable representation.

In some examples, the SCE sensor interface 310 can provide visual and/or audio feedback to pilot(s) in the cockpit 138 of FIGS. 1-2 based on sensor conditions. For example, the SCE sensor interface 310 can communicate to a user interface in the cockpit 138 to inform the pilot(s) when a hydraulic pressure associated with one or both of the hydraulic systems 218, 220 is low and/or dropping or has already dropped beyond a pre-determined threshold (e.g., a hydraulic pressure threshold). In such examples, the SCE sensor interface 310 can generate an auditory alert (e.g., an audible alert via one or more speakers), a visual alert on the user interface, etc., and/or a combination thereof. For example, the alerts can correspond to audible sounds, flashing lights, etc., that are indicative of particular sensor conditions based on sensor measurements.

In the illustrated example of FIG. 3, the SCE controller 140 includes the control wheel position determiner 320 to obtain control wheel position measurements from the SCE sensor interface 310 and determine an angular position of the control wheel(s) 202, 204 based on the control wheel position measurements. In some examples, the control wheel position determiner 320 transmits the angular position to the spoiler controller 330, the backup controller 340, or an example aileron controller 430 discussed below in connection with FIG. 4.

In the illustrated example of FIG. 3, the SCE controller 140 includes the spoiler controller 330 to generate and transmit commands to the spoiler actuators 226A-D, 228A-D to control the spoilers 124A-D, 126A-D on the aircraft wings 102, 104. In some examples, the spoiler controller 330 generates commands based on control wheel position measurements and/or the pilot input force at the control wheels 202, 204 to actuate and/or otherwise cause the spoiler actuators 226A-D, 228A-D to engage, move, etc. In such examples, the spoiler controller 330 generates the commands based on data obtained from the SCE sensor interface 310. In other examples, the spoiler controller 330 can generate commands based on the flight parameters 450 stored in an example FCC database 440 discussed below in connection with FIG. 4.

In the illustrated example of FIG. 3, the SCE controller 140 includes the backup controller 340 to generate and transmit commands to the electric actuator 238 to control the aileron actuators 230, 232. In some examples, the backup controller 340 generates flight commands based on the control wheel position. In such examples, the backup controller 340 can generate flight commands when the aircraft roll operation control system 200 is operating in the backup control mode. In such examples, the backup controller 340 controls the electric actuator 238 in response to both hydraulic systems 218, 220 being inoperable (e.g., low pressure).

In the illustrated example of FIG. 3, the SCE controller 140 includes the SCE database 350 to record data (e.g., sensor data, sensor measurements, generated commands, generated alerts, etc.). The SCE database 350 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The SCE database 350 may additionally or alternatively be implemented by one or more double data rate (DDR) memories, such as DDR, DDR2, DDR3, DDR4, mobile DDR (mDDR), etc. The SCE database 350 may additionally or alternatively be implemented by one or more mass storage devices such as hard disk drive(s), compact disk drive(s), digital versatile disk drive(s), solid-state disk drive(s), etc. While in the illustrated example the SCE database 350 is illustrated as a single database, the SCE database 350 may be implemented by any number and/or type(s) of databases. Furthermore, the data stored in the SCE database 350 may be in any data format such as, for example, binary data, comma delimited data, tab delimited data, structured query language (SQL) structures, etc.

While an example manner of implementing the SCE controller 140 of FIGS. 1-2 is illustrated in FIG. 3, one or more of the elements, processes, and/or devices illustrated in FIG. 3 may be combined, divided, re-arranged, omitted, eliminated, and/or implemented in any other way. Further, the example SCE sensor interface 310, the example control wheel position determiner 320, the example spoiler controller 330, the example backup controller 340, the example SCE database 350, and/or, more generally, the example SCE controller 140 of FIG. 3 may be implemented by hardware, software, firmware, and/or any combination of hardware, software, and/or firmware. Thus, for example, any of the example SCE sensor interface 310, the example control wheel position determiner 320, the example spoiler controller 330, the example backup controller 340, the example SCE database 350, and/or, more generally, the example SCE controller 140 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example SCE sensor interface 310, the example control wheel position determiner 320, the example spoiler controller 330, the example backup controller 340, and the example SCE database 350 is/are hereby expressly defined to include a non-transitory computer readable storage device or storage disk such as a memory, a digital versatile disk (DVD), a compact disk (CD), a Blu-ray disk, etc., including the software and/or firmware. Further still, the example SCE controller 140 of FIGS. 1-2 may include one or more elements, processes, and/or devices in addition to, or instead of, those illustrated in FIG. 3, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
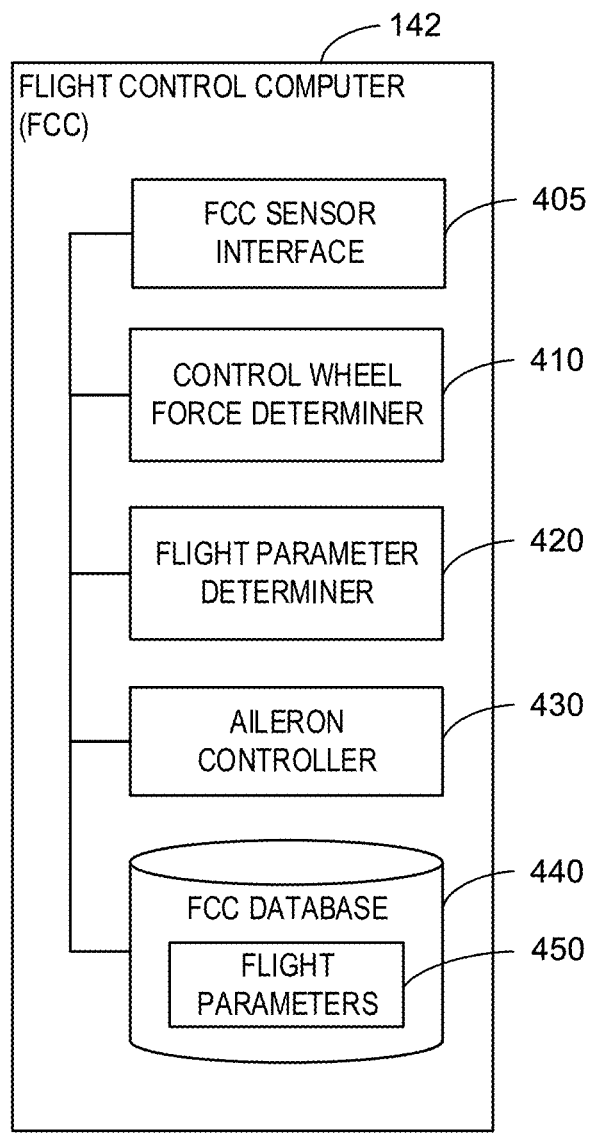
FIG. 4 is a block diagram of an example implementation of a flight control computer (FCC) of the aircraft roll operation control system of FIG. 2.

FIG. 4 is a block diagram of an example implementation of the FCC 142A-B of FIGS. 1 and/or 2 to control the autopilot actuators 236A, 236B. In the illustrated example of FIG. 4, the FCC 142A-B includes an example FCC sensor interface 405, the control wheel force determiner 410, an example flight parameter determiner 420, the aileron controller 430, and an example FCC database 440 including example flight parameters 450.

In the illustrated example of FIG. 4, the FCC 142A-B includes the FCC sensor interface 405 to facilitate communication with sensors of the aircraft roll operation control system 200 of FIG. 2. For example, the FCC sensor interface 405 can obtain sensor data, sensor measurements, etc., from the force sensors 208, 210 and/or the pressure sensors 222, 224. In some examples, the FCC sensor interface 405 of the FCC 142A-B provides visual and/or audio feedback to pilot(s) in the cockpit 138 of FIGS. 1-2 based on sensor conditions as described above in connection with FIG. 3.

In the illustrated example of FIG. 4, the FCC 142A-B includes the control wheel force determiner 410 to obtain control wheel force measurements from the force sensors 208, 210 via the FCC sensor interface 405 and determine the amount of force (e.g., a force value) being applied to the control wheel(s) 202, 204 by the pilot(s). In some examples, the control wheel force determiner 410 transmits the force values to the spoiler controller 330 of FIG. 3.

In the illustrated example of FIG. 4, the FCC 142A-B includes the flight parameter determiner 420 to determine flight parameters 450 based on sensor data and/or determine whether autopilot (e.g., autopilot control of the aircraft 100 of FIG. 1) is engaged. In some examples, the flight parameter determiner 420 determines the flight parameters 450 based on data obtained from the FCC sensor interface 405 and determines whether autopilot is engaged based on the flight parameters 450. In such examples, the flight parameter determiner 420 can transmit a message, a notification, etc., to the FCC sensor interface 405, the control wheel position determiner 320, and/or the control wheel force determiner 410, where the message, the notification, etc., includes an indication whether autopilot is engaged or disengaged.

In some examples, the flight parameter determiner 420 obtains the flight parameters 450 that include inertial reference unit (IRU) data (e.g. airspeed, angle of attack, altitude, position), pitot static data, antenna readings, etc., and/or other airplane systems sensor data. The flight parameter determiner 420 can transmit the flight parameters 450 to the user interface of the cockpit 138 to provide navigational information and/or the status of aircraft roll operation control system 200 components to the pilot(s). In such examples, the flight parameters 450 can be generated by internal and/or external sensors that monitor aircraft conditions and environmental conditions.

In the illustrated example of FIG. 4, the FCC 142A-B includes the aileron controller 430 to generate and transmit commands to the autopilot actuators 236A, 236B to control the aileron actuators 230, 232. In some examples, the aileron controller 430 can generate commands based on the flight parameters 450 to control the autopilot actuators 236A, 236B. In such examples, the aileron controller 430 can generate commands based on the flight parameters 450 stored in the FCC database 440.

In the illustrated example of FIG. 4, the FCC 142A-B includes the FCC database 440 to record data (e.g., sensor data, sensor measurements, generated commands, generated alerts, etc.). The FCC database 440 may be implemented by a volatile memory (e.g., a SDRAM, DRAM, RDRAM, etc.) and/or a non-volatile memory (e.g., flash memory). The FCC database 440 may additionally or alternatively be implemented by one or more DDR memories, such as DDR, DDR2, DDR3, DDR4, mDDR, etc. The FCC database 440 may additionally or alternatively be implemented by one or more mass storage devices such as hard disk drive(s), compact disk drive(s), digital versatile disk drive(s), solid-state disk drive(s), etc. While in the illustrated example the FCC database 440 is illustrated as a single database, the FCC database 440 may be implemented by any number and/or type(s) of databases. Furthermore, the data stored in the FCC database 440 may be in any data format such as, for example, binary data, comma delimited data, tab delimited data, SQL structures, etc.

While an example manner of implementing the example FCC 142A-B of FIGS. 1-2 is illustrated in FIG. 4, one or more of the elements, processes, and/or devices illustrated in FIG. 4 may be combined, divided, re-arranged, omitted, eliminated, and/or implemented in any other way. Further, the example FCC sensor interface 405, the example control wheel force determiner 410, the example flight parameter determiner 420, the example aileron controller 430, the example FCC database 440, and/or, more generally, the example FCC 142A-B of FIG. 4 may be implemented by hardware, software, firmware, and/or any combination of hardware, software, and/or firmware. Thus, for example, any of the example FCC sensor interface 405, the example control wheel force determiner 410, the example flight parameter determiner 420, the example aileron controller 430, the example FCC database 440, and/or, more generally, the example FCC 142A-B could be implemented by one or more analog or digital circuit(s), logic circuits, programmable processor(s), programmable controller(s), GPU(s), DSP(s), ASIC(s), PLD(s), and/or FPLD(s). When reading any of the apparatus or system claims of this patent to cover a purely software and/or firmware implementation, at least one of the example FCC sensor interface 405, the example control wheel force determiner 410, the example flight parameter determiner 420, the example aileron controller 430, and/or the example FCC database 440 is/are hereby expressly defined to include a non-transitory computer readable storage device or storage disk such as a memory, a DVD, a CD, a Blu-ray disk, etc., including the software and/or firmware. Further still, the example FCC 142A-B of FIGS. 1-2 may include one or more elements, processes, and/or devices in addition to, or instead of, those illustrated in FIG. 4, and/or may include more than one of any or all of the illustrated elements, processes, and devices.

In examples disclosed herein, the SCE controller 140 and/or the FCC 142A-B determine the mode in which the SCE controller 140, the FCC 142A-B, and/or, more generally, the aircraft roll operation control system 200 operates. As previously mentioned, the aircraft roll operation control system 200 can operate in the autopilot control mode (e.g., a control or operating mode where hydraulic power is available), the normal control mode (e.g., a control or operating mode where (1) there is no mechanical control jam and (2) hydraulic power is available), the backup control mode (e.g., a control or operating mode where hydraulic power is not available), and the force control mode (e.g., a control or operating mode where (1) there is a mechanical control jam and (2) hydraulic power is available). Each operating mode can be invoked by the pilot or in response to an aircraft component (e.g., hydraulic systems 218, 220, electric actuator 238, pressure sensors 222, 224, etc.) not functioning properly and/or otherwise operating in a non-responsive manner or mode of operation.

In some examples, the aircraft 100 of FIG. 1 operates in autopilot control mode when autopilot flight commands are generated by the FCC 142A-B. In autopilot control mode, the FCC 142A-B can control the autopilot actuators 236A, 236B based on the generated autopilot flight commands. In such examples, the SCE controller 140 can control the spoiler actuators 226A-D, 228A-D based on the control wheel position generated from the motion of the aileron actuators 230, 232 that is back-driven through the body run cable 240 to the wheel position sensors 212, 214. The FCC 142A-B can control the autopilot actuators 236A, 236B based on the autopilot flight commands to control the aileron actuators 230, 232 that are operatively coupled to the wing cable 234 to move the ailerons 120, 122.

In some examples, the aircraft 100 operates in normal control mode when (1) flight commands are generated by the SCE controller 140 based on the control wheel position and (2) the aileron actuators 230, 232 are actuated based on control wheel 202, 204 movement transferred through the body run cable 240. In such examples, the SCE controller 140 can control the spoiler actuators 226A-D, 228A-D based on the generated flight commands to control the motion, the movement, etc., of the spoilers 124A-D, 126A-D and the control wheel movement transferred through the body run cable 240 control the ailerons 120, 122.

In some examples, in response to both of the hydraulic systems 218, 220 being non-responsive and/or during a PBIT, the aircraft 100 operates in the backup control mode. In the backup control mode, the backup controller 340 can control the electric actuator 238, based on the control wheel position, to actuate (e.g., activate, enable, etc.) the lever stops of aileron actuators 230, 232 that are operatively coupled to the wing cable 234 to control the ailerons 120, 122.

In some examples, in response to a mechanical control jam in the aircraft roll operation control system 200, the aircraft 100 operates in force control mode. In force control mode, a mechanical control jam is detected by the SCE controller 140 as a position threshold difference between the wheel position sensors 212, 214 and the actuator position sensors 247, 249. In some examples, a mechanical control jam is detected based on a force threshold difference between particular force values and is further described below in connection with FIGS. 7-8. In force control mode, the force sensors 208, 210 measure a pilot control wheel input and transmit the pilot control wheel input to the FCC 142A-B and the SCE controller 140 to control the spoilers 124A-D and 126A-D.

Figure 5:
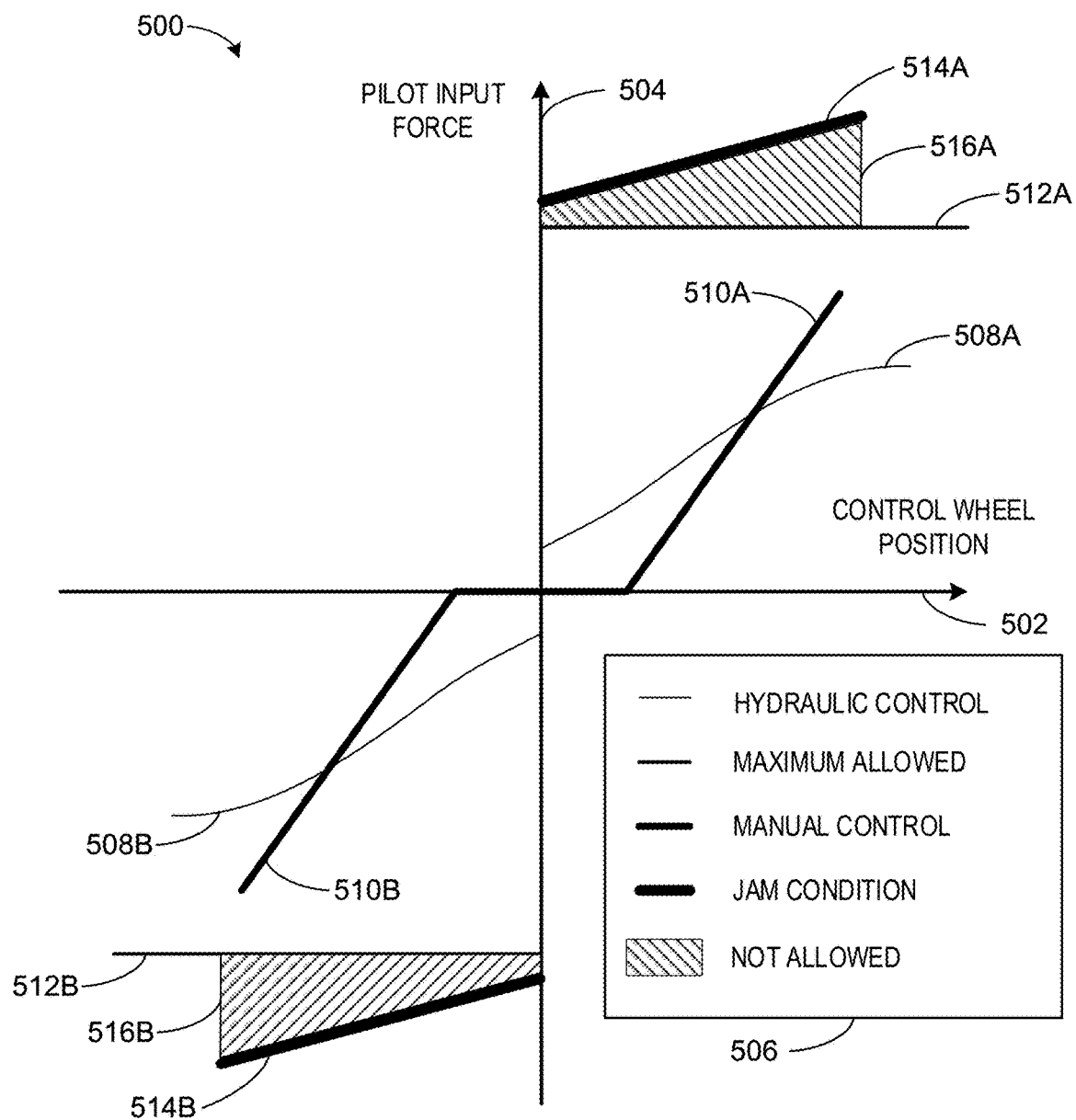
FIG. 5 is a diagram representative of pilot input forces for example roll control techniques.

FIG. 5 depicts an example diagram 500 representative of a required control wheel input force, by a pilot, to move the control wheel(s) 202, 204 of FIG. 2 to a desired angular position under certain aircraft control conditions using an example roll control technique. In FIG. 5, an X-axis 502 represents the control wheel position and a Y-axis 504 represents the pilot input force. For example, the control wheel position of the X-axis 502 can correspond to a position of the control wheel(s) 202, 204 (e.g., based on measurements obtained from the wheel position sensors 212, 214 of FIG. 2). In other examples, the pilot input force can correspond to a force applied by the pilot at one of the control wheels 202, 204 (e.g., based on measurements obtained from the force sensors 208, 210).

In the illustrated example of FIG. 5, a first example legend 506 includes the line weight, line type, and/or fill pattern and corresponding identifier corresponding to the diagram 500 of FIG. 5. In FIG. 5, the intersection of the X-axis 502 and Y-axis 504 corresponds to a zero and/or resting position of the control wheel(s) 202, 204. Furthermore, each line and/or area represented in the diagram 500 of FIG. 5 has an opposite line (e.g., a line mirrored about the X-axis 502 and the Y-axis 504) and/or an opposite area (e.g., an area mirrored about the X-axis 502 and the Y-axis 504) due to the resting position of the control wheel(s) 202, 204 being at the intersection of the axes 502, 504. For example, when one of the control wheels 202, 204 is rotated to the right or in a clockwise motion or direction, the control wheel position is represented as a positive angle (e.g., to the right of the intersection of the axes 502, 504) and input force is represented as a positive force (e.g., above the intersection of the axes 502, 504). However, when one of the control wheels 202, 204 is rotated to the left or in a counter-clockwise motion or direction, the control wheel position can be represented as a negative angle (e.g., to the left of the intersection of the axes 502, 504) and the input force, while still a positive input force when nominally measured, is represented in the diagram 500 of FIG. 5 as a negative force (e.g., below the intersection of the axes 502, 504).

In FIG. 5, lines 508A, 508B represent a first relationship between the pilot input force and the control wheel position. In FIG. 5, the first relationship is produced by the FAC device 242 and corresponds to the aircraft roll operation control system 200 of FIG. 2 operating under hydraulic control and without a mechanical control jam. In FIG. 5, lines 510A, 510B represent a second relationship between the pilot input force and the control wheel position. In FIG. 5, the second relationship is produced by the FAC device 242 and corresponds to the aircraft roll operation control system 200 of FIG. 2 operating under manual control and without a mechanical control jam. In FIG. 5, lines 514A, 514B represent a third relationship between the pilot input force and the control wheel position. In FIG. 5, the third relationship is produced by the FAC device 242 and corresponds to the aircraft roll operation control system 200 of FIG. 2 operating under hydraulic control with a mechanical control jam present (e.g., one or more of the ailerons 120, 122, one or more of the spoilers 124A-D, 126A-D, one or more associated components, etc., and/or a combination thereof are jammed and/or otherwise non-responsive). In FIG. 5, lines 514A, 514B correspond to the aircraft roll operation control system 200 response with a mechanical control jam present and without a force control mode. The force control mode is further described in connection with FIGS. 9 and 12.

Typical aviation regulations set forth a maximum pilot input force that is allowed (e.g., a maximum allowed pilot input force) and is illustrated in FIG. 5 by lines 512A and 512B. The area between the jam conditions 514A, 514B and the maximum allowed pilot input force lines 512A, 512B are illustrated by a first zone 516A and a second zone 516B. In FIG. 5, the jam conditions 514A, 514B are located above and/or beyond the corresponding maximum allowed pilot input forces 512A, 512B and, thus, are not allowed according to typical aviation regulations. For example, in response to a hydraulic or mechanical control jam condition, a control wheel position and a pilot input force, required by the pilot to overcome the jam condition, exceeds aviation regulations set forth for improved flight control.

Figure 6:
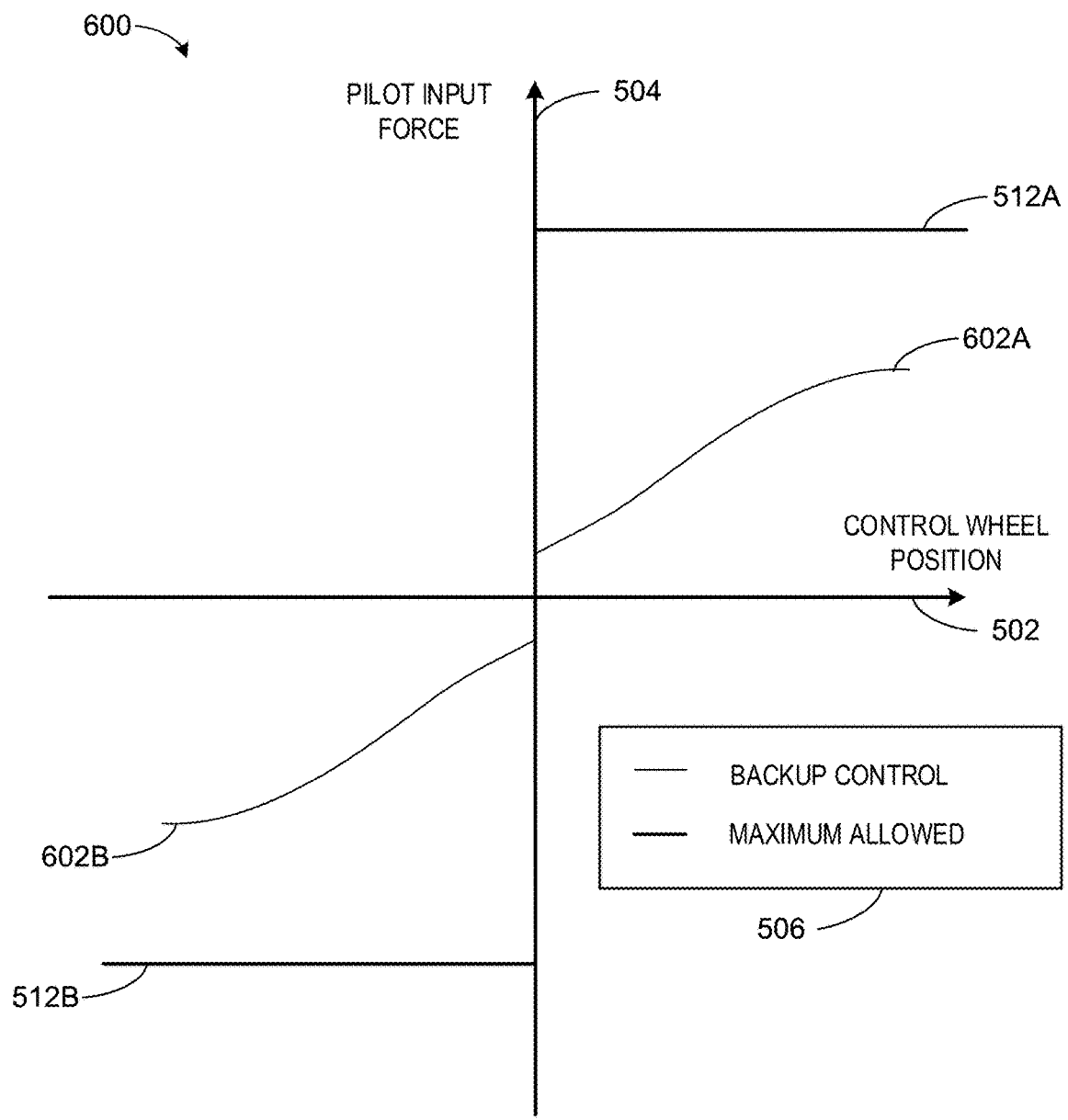
FIG. 6 is a diagram representative of pilot input forces for roll control using the aircraft roll operation control system of FIG. 2 during an example backup control mode.

FIG. 6 depicts an example diagram 600 representative of a required control wheel input force, by a pilot of the aircraft 100 of FIG. 1, to move the control wheel(s) 202, 204 of FIG. 2 to a desired angular position when the aircraft 100 is operating in the backup control mode. In FIG. 6, the diagram 600 depicts the X-axis 502, Y-axis 504, the first legend 506, the relationship lines 508A, 508B in connection with operating the aircraft roll operation control system 200 during backup control mode, and the maximum allowed pilot input force lines 512A, 512B of FIG. 5.

In the illustrated example of FIG. 6, the required pilot control wheel force and control wheel position relationship is illustrated as backup control lines 602A, 602B. The backup control lines 602A, 602B represent what the pilot feels when actuating the electric actuator 238 during backup control mode. As shown, the backup control lines 602A, 602B fall below the maximum allowed pilot input force lines 512A, 512B and mimic the hydraulic control lines 508A, 508B of FIG. 5.

Figure 7:
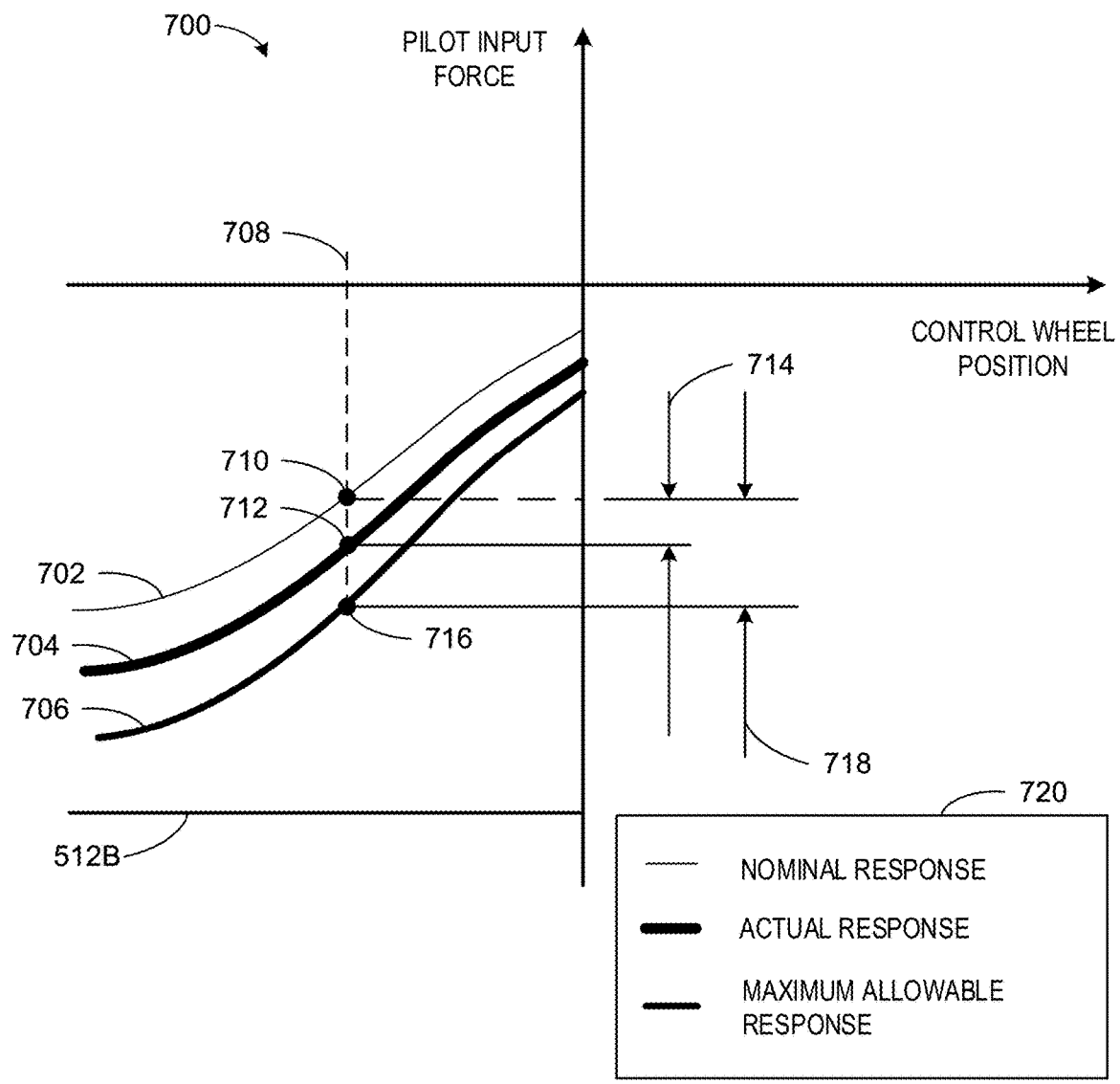
FIG. 7 is a diagram representative of example responses based on example pilot input forces and example control wheel positions.

FIG. 7 depicts an example diagram 700 representative of example responses 702, 704, 706 based on the pilot input force represented by the X-axis 502 of FIGS. 5-6 and the control wheel position represented by the Y-axis 504 of FIGS. 5-6. In FIG. 7, the responses 702, 704, 706 include an example nominal response 702, an example actual response 704, and an example maximum allowable response 706. Each of the example responses 702, 704, 706 are representative of what the pilot experiences (e.g., feels, observes, etc.) during normal control mode and/or backup control mode.

In the illustrated example of FIG. 7, the nominal response 702 is representative of nominal characteristics of the FAC device 242 and/or other components within the aircraft roll operation control system 200 of FIG. 2 during normal control mode and/or backup control mode. Stately differently, the nominal response 702 represents the aircraft roll operation control system 200 response if every component operates at the lowest possible tolerance during normal control mode and/or backup control mode. The nominal response 702 values are stored in the SCE database 350 of FIG. 4.

In the illustrated example of FIG. 7, the spoiler controller 330 generates the actual response 704 based on the current control wheel position and control wheel force. For example, the actual response line 704 can correspond to the current response of the aircraft roll operation control system 200 and can change based on the pilot inputs. In FIG. 7, the maximum allowable response 706 is representative of the response of the aircraft roll operation control system 200 if every component operates at the highest possible tolerance during normal control mode and/or backup control mode.

In the illustrated example of FIG. 7, an example control wheel position 708 is represented by a vertical dashed line and intersects with the response lines 702, 704, 706 to identify corresponding response values (e.g., pilot input force values) 710, 712, 716 associated with the response lines 702, 704, 706. As used herein, the term "response value" can correspond to a pilot input force value at a specified control wheel position, a control wheel position at a specified pilot input force value, etc., or any other value associated with the responses 702, 704, 706 as depicted in the example of FIG. 7.

In the illustrated example of FIG. 7, the response values 710, 712, 716 for control wheel position 708 include an example nominal response value 710 corresponding to the nominal response 702, an example actual response value 712 corresponding to the actual response 704, and an example maximum allowable response value 716 corresponding to the maximum allowable response 706. In FIG. 7, the response values 710, 712, 716 correspond to pilot input force values at the control wheel position 708 that can be used by the spoiler controller 330 to determine whether a mechanical control jam is present. For example, when the pilot manipulates one of the control wheels 202, 204 to generate the control wheel position 708, the spoiler controller 330 determines the actual response value 712 and maps one or more of the responses 710, 716. In such examples, the spoiler controller 330 can map the nominal response value 710 to the control wheel position 708 based on the nominal response 702. The spoiler controller 330 can also map the maximum allowable response value 716 to the control wheel position 708 based on the maximum allowable response 706.

In the illustrated example of FIG. 7, the spoiler controller 330 calculates a first example difference 714 between the nominal force value 710 and the actual response value 712. In FIG. 7, the spoiler controller 330 calculates a second example difference 718 between the nominal response value 710 and the maximum allowable response value 716. Advantageously, the spoiler controller 330 can identify a presence of a mechanical control jam based on the first difference 714, because the first difference 714 can correspond to a significant deviation from the nominal response 702.

In some examples, the spoiler controller 330 executes comparisons of the first difference 714 to the second difference 718 to determine whether a mechanical control jam is present within the aircraft roll operation control system 200. For example, if the first difference 714 is greater than the second difference 718, a mechanical control jam is present within the aircraft roll operation control system 200, and the spoiler controller 330 invokes the aircraft 100 into force control mode. Further detail on determining whether a mechanical control jam is present is described in connection with FIG. 8. In FIG. 7, a second example legend 720 is depicted to annotate the different line weights, line types, and corresponding identifiers of the responses 702, 704, 706 included in the example diagram 700 of FIG. 7.

Figure 8:
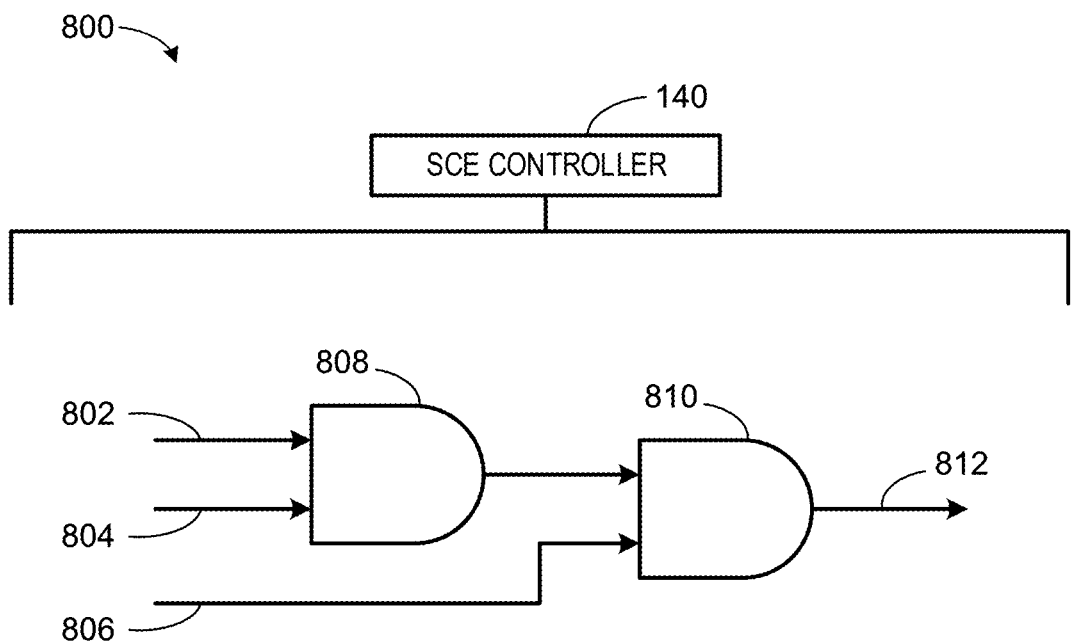
FIG. 8 is a diagram representative of an example logic circuit that can be implemented by the SCE controller of FIGS. 2-3 to determine whether a mechanical control jam is present within the aircraft roll operation control system of FIG. 2.

FIG. 8 depicts an example logic circuit 800 representative of example logic that can be implemented by the SCE controller 140 to determine whether a mechanical control jam is present within the aircraft roll operation control system 200. In FIG. 8, the logic circuit 800 includes a first example input 802, a second example input 804, a third example input 806, a first example logic gate 808, a second example logic gate 810, and an example output 812. The output 812 represents the condition in which the spoiler controller 330 invokes the aircraft 100 into force control mode. In FIG. 8, the first and second example logic gates 808, 810 are AND gates. Alternatively, the first and second logic gates 808, 810 may be any other type of hardware, logic circuits, etc., and/or a combination thereof.

In the illustrated example of FIG. 8, the first input 802 is representative of the first difference 714 of FIG. 7 being greater than the second difference 718 of FIG. 7. The second input 804 is representative of the difference between the control wheel position and the wing quadrant position being greater than a threshold specific to the aircraft roll operation control system 200. In FIG. 8, both the first and second inputs 802, 804 are to be satisfied to advance through the logic circuit 800.

In the illustrated example of FIG. 8, the third input 806 is representative of the condition where both hydraulic systems 218, 220 are operating in a normal or conventional manner. In response to the first, second, and third inputs 802, 804, 806 being true, the spoiler controller 330 can invoke the aircraft roll operation control system 200 into force control mode and calculate a force value to help overcome the mechanical control jam and stay below the aviation regulated allowed forces. Additional detail regarding the force control mode is described below in connection with FIG. 12, and, more specifically, with blocks 1212-1216 of FIG. 12.

Flowcharts representative of example hardware logic, machine readable instructions, hardware implemented state machines, and/or any combination thereof for implementing the SCE controller 140 of FIGS. 1, 2, and/or 3, the FCC 142A-B of FIGS. 1, 2, and/or 4, and/or, more generally, the aircraft roll operation control system 200 of FIG. 2 are shown in FIGS. 9-13. The machine readable instructions may be an executable program or portion of an executable program for execution by a computer processor such as the processor 1412 shown in the example processor platform 1400 discussed below in connection with FIG. 14 and/or the processor 1512 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory associated with the processor 1412 of FIG. 14 and/or the processor 1512 of FIG. 15, but the entire program and/or parts thereof could alternatively be executed by a device other than the processor 1412 of FIG. 14, the processor 1512 of FIG. 15, and/or embodied in firmware or dedicated hardware. Further, although the example program is described with reference to the flowcharts illustrated in FIGS. 9-13, many other methods of implementing the example SCE controller 140, the FCC 142A-B, and/or, more generally, the aircraft roll operation control system 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 9-13 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 9:
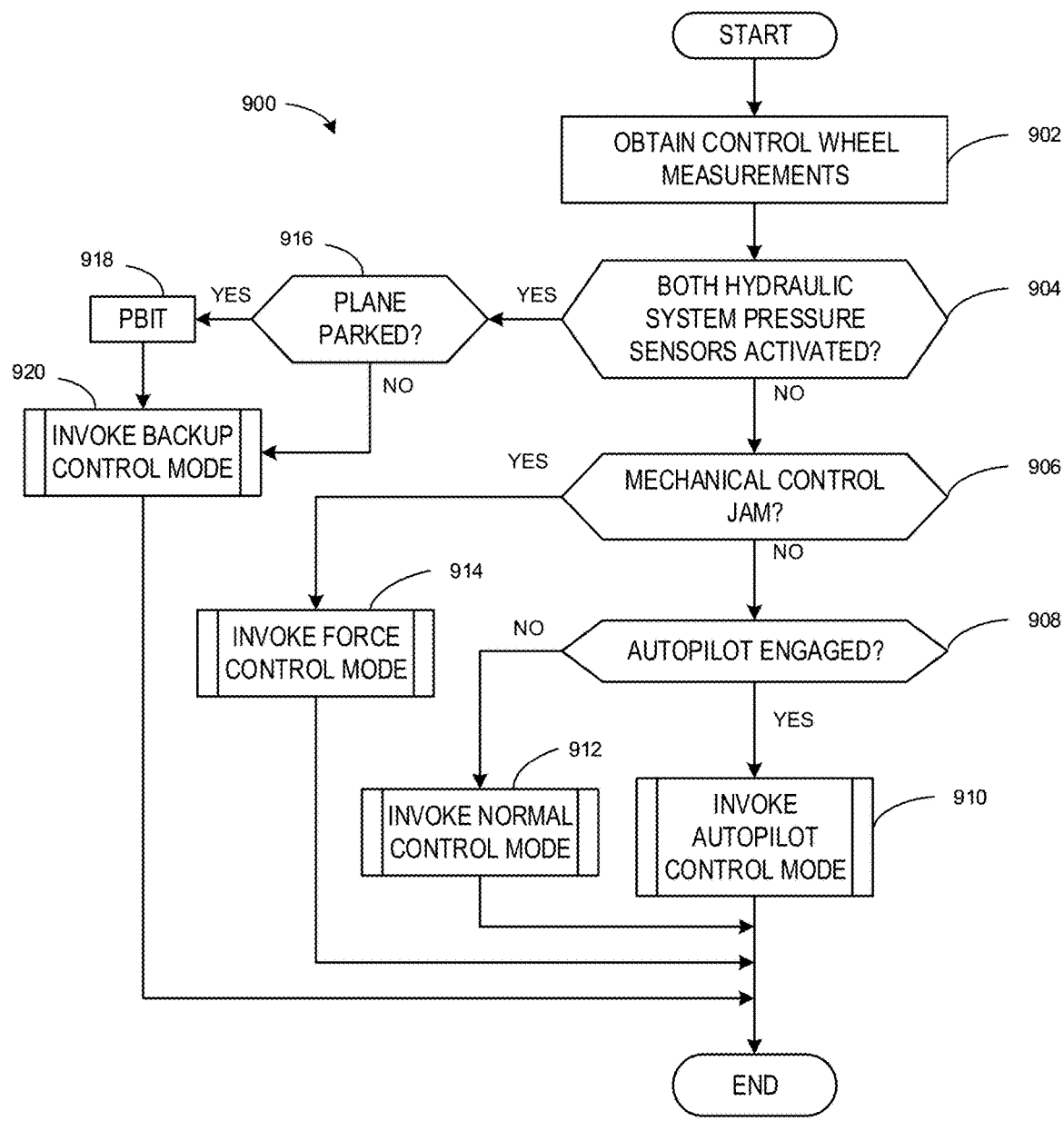
FIG. 9 is a flowchart representative of example machine readable instructions that may be executed to implement the SCE controller of FIGS. 2-3, the FCC of FIGS. 2 and 4, and/or, more generally, the example aircraft roll operation control system of FIG. 2 to control aircraft roll control operations of the example aircraft of FIG. 1.

FIG. 9 is a flowchart representative of example machine readable instructions 900 that may be executed to implement the SCE controller 140 of FIGS. 1, 2, and/or 3, the FCC 142A-B of FIGS. 1, 2, and/or 4, and/or, more generally, the aircraft roll operation control system 200 of FIG. 2 to control aircraft roll control operations of the aircraft 100 of FIG. 1. The machine readable instructions 900 of FIG. 9 begin at block 902 at which the SCE controller 140 and/or the FCC 142A-B obtains control wheel measurement(s). For example, the control wheel position determiner 320 (FIG. 3) can obtain the control wheel position 708 of FIG. 7 from the SCE sensor interface 310 of FIG. 3. In such examples, the control wheel force determiner 410 (FIG. 4) can obtain the actual force value 712 of FIG. 7 from the force sensors 208, 210 of FIG. 2, which can correspond to the control wheel position 708 of FIG. 7.

At block 904, the FCC 142A-B determines whether pressure in the hydraulic system(s) satisfy a threshold. For example, the FCC sensor interface 405 (FIG. 3) can obtain a pressure measurement from one of the pressure sensor(s) 222, 224 of FIG. 2 and determine whether the pressure measurement associated with the hydraulic system(s) 218, 220 satisfies a threshold (e.g., a pre-defined threshold, a pressure threshold, etc.) based on the pressure measurements. In such examples, the FCC sensor interface 405 can determine that the pressure measurement satisfies the threshold when the pressure measurement is less than the threshold.

If, at block 904, the FCC 142A-B determines that the pressure in the hydraulic system(s) does not satisfy the threshold, then, at block 916, the SCE controller 140 and/or the FCC 142A-B determine whether the aircraft is parked (e.g., not moving on a ground surface). If, at block 904, the FCC 142A-B determines that the pressure in the hydraulic system(s) satisfies the threshold, then, at block 906, the SCE controller 140 determines whether there is a mechanical control jam. For example, the spoiler controller 330 can obtain a force measurement from the control wheel force determiner 410 and determine whether a mechanical control jam is present based on the force measurement. In such examples, the spoiler controller 330 can compare the force value with force values associated with the nominal response 704 and/or maximum allowable response 706 of FIG. 7 to determine whether a mechanical control jam is present within the aircraft roll operation control system 200. In some examples, the spoiler controller 330 can also determine whether a mechanical control jam is present by comparing the position of the control wheels 202, 204 to the position of the actuator position sensors 247, 249. In such examples, if the difference does not satisfy a threshold, a mechanical control jam may be present within the aircraft roll operation control system 200.

If, at block 906, the spoiler controller 330 determines that a mechanical control jam is present, then, at block 914, the SCE controller 140 invokes force control mode. For example, the spoiler controller 330 can calculate a force to use when controlling the spoilers 124A-D, 126A-D in the event of a mechanical control jam. An example process that may be used to implement block 914 is described below in connection with FIG. 12.

If at block 906, the SCE controller 140 determines that there is not a mechanical control jam present, then, at block 908, the FCC 142A-B determines whether autopilot is engaged. For example, the flight parameter determiner 420 can obtain data from the FCC sensor interface 405 and determine whether autopilot is engaged based on the data. In such examples, the data obtained from the FCC sensor interface 405 is used by the flight parameter determiner 420 to determine the flight parameters 450.

If at block 908, the FCC 142A-B determines that autopilot is engaged, then, at block 910, the FCC 142A-B generates autopilot flight command(s) for flight control surfaces based on flight parameters 450. For example, the spoiler controller 330 and/or the aileron controller 430 can generate commands for flight control surfaces based on autopilot flight commands. An example process that may be used to implement block 910 is described below in connection with FIG. 10.

If at block 908, the FCC 142A-B determines that autopilot is not engaged, then, at block 912, the SCE controller 140 generates command(s) for flight control surfaces based on pilot inputs. For example, the spoiler controller 330 can generate commands for flight control surfaces based on pilot inputs. An example process that may be used to implement block 912 is described below in connection with FIG. 11.

At block 916, the SCE controller 140 and/or the FCC 142A-B determine whether the aircraft 100 is parked. For example, the flight parameter determiner 420 (FIG. 4) can determine that the aircraft 100 is parked based on the flight parameters 450 (FIG. 4). In such examples, the flight parameter determiner 420 can determine that the aircraft 100 is parked based on a ground speed of the aircraft 100 being zero. If, at block 916, the SCE controller 140 and/or the FCC 142A-B determine that the aircraft is parked, then, at block 918, the SCE controller 140 and/or the FCC 142A-B conduct a PBIT to ensure that the system components remain capable of controlling the ailerons 120, 122 when both hydraulic systems 218, 220 are inoperable and/or malfunctioning. In some examples, a PBIT can be conducted at pilot discretion when the aircraft 100 is in a parked position.

If, at block 916, the SCE controller 140 and/or the FCC 142A-B determine that the aircraft is not parked, then, at block 920, the SCE controller 140 invokes backup control mode. For example, the spoiler controller 330 can control the electric actuator 238 by invoking the APU 144 of FIGS. 1-2 to control the aileron actuators 230, 232. An example process that may be used to implement block 920 is described below in connection with FIG. 13. Once at least one of the autopilot control mode, the normal control mode, the force control mode, or the backup control mode are invoked, the instructions of FIG. 9 conclude until the aircraft roll operation control system 200 conditions change (e.g., hydraulic pressure changes, jam occurs, autopilot disengages, etc.).

Figure 10:
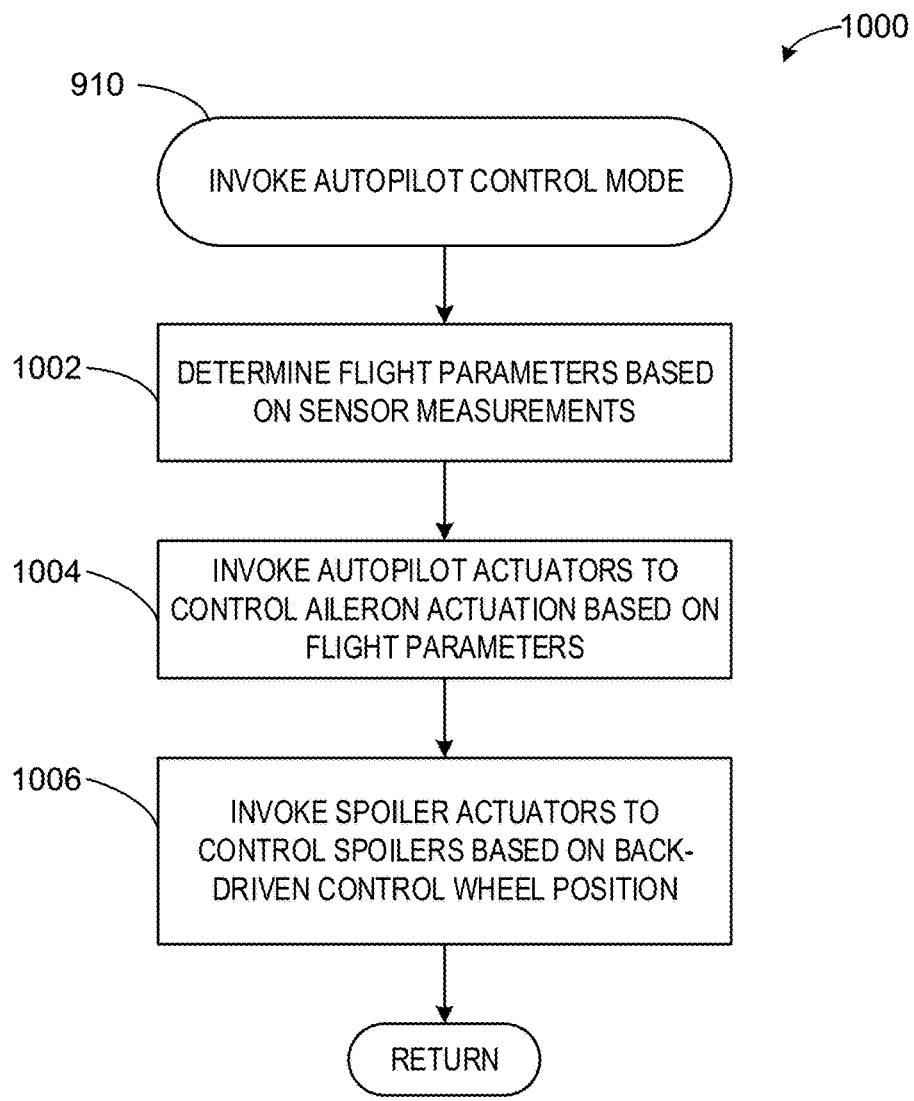
FIG. 10 is a flowchart representative of example machine readable instructions that may be executed to implement the SCE controller of FIGS. 2-3, the FCC of FIGS. 2 and 4, and/or, more generally, the example aircraft roll operation control system of FIG. 2 to invoke an example autopilot control mode.

FIG. 10 is a flowchart representative of example machine readable instructions 1000 that may be executed to implement the SCE controller 140 of FIGS. 1, 2, and/or 3, the FCC 142A-B of FIGS. 1, 2, and/or 4, and/or, more generally, the aircraft roll operation control system 200 of FIG. 2 to invoke autopilot control mode. The machine readable instructions 1000 of FIG. 10 may be executed to implement block 910 of the machine readable instructions 900 of FIG. 9. The machine readable instructions 1000 of FIG. 10 begin at block 1002, at which the FCC 142A-B determines the flight parameters 450 based on sensor measurements. For example, the flight parameter determiner 420 of FIG. 4 determines flight parameters 450 based on data obtained from the FCC sensor interface 405.

At block 1004, the FCC 142A-B invokes the autopilot actuators 236A, 236B to control aileron actuation based on the flight parameters 450. For example, the aileron controller 430 of FIG. 4 invokes the autopilot actuators 236A, 236B to control the aileron actuators 230, 232 that in turn control the wing cable 234. The movement of the wing cable 234 controls the aileron linkages 246, 248 that, in turn, control the ailerons 120, 122. In such examples, the actuation of the aileron actuators 230, 232 controls the body run cable 240 and back-drives the motion to the wheel position sensors 212, 214 and the control wheels 202, 204

At block 1006, the SCE controller 140 invokes the spoiler actuators 226A-D, 228A-D to control the spoilers 124A-D, 126A-D based on the back-driven control wheel position. For example, the spoiler controller 330 of FIG. 3 invokes the spoiler actuators 226A-D, 228A-D to control the spoilers, where the position of the control wheels 202, 204, determined by the back-driven motion of the aileron actuators 230, 232, is used by the spoiler controller 330 to generate commands to control the spoilers 124A-D, 126A-D.

Figure 11:
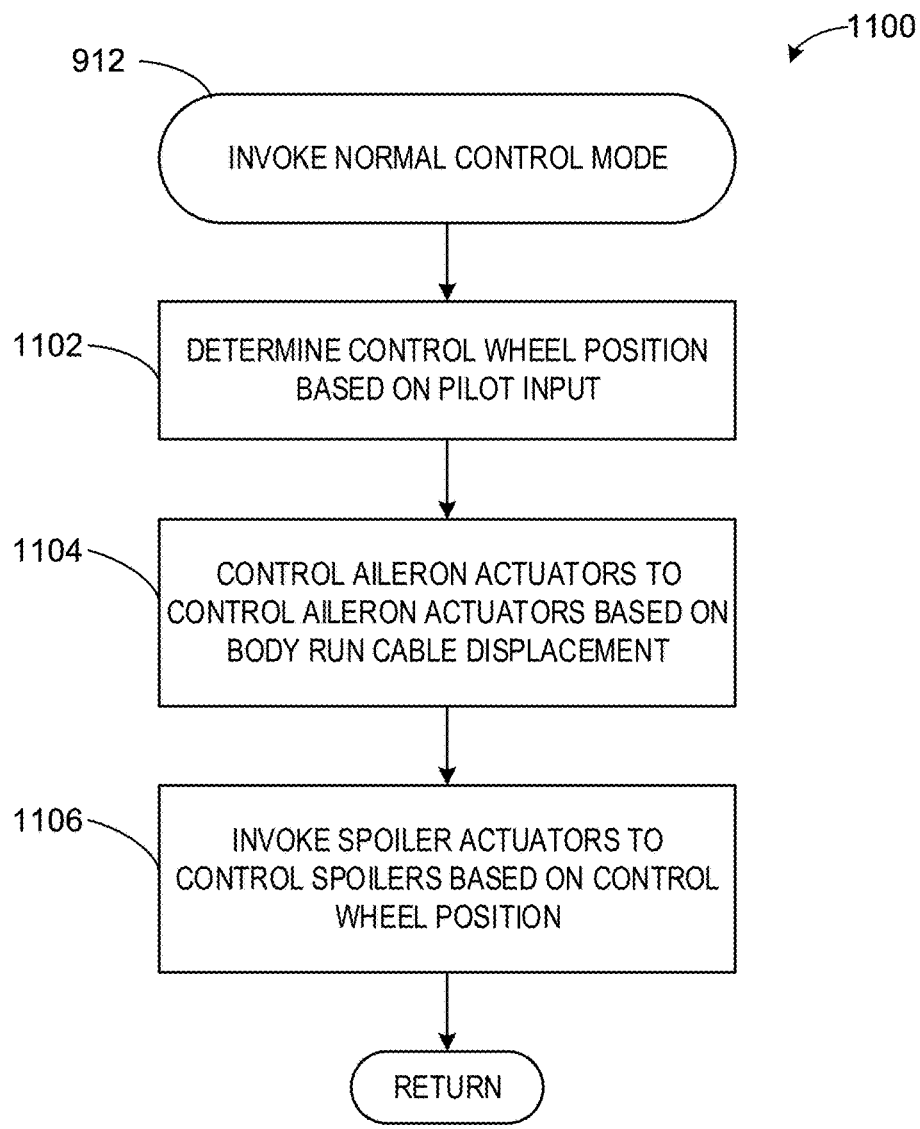
FIG. 11 is a flowchart representative of example machine readable instructions that may be executed to implement the SCE controller of FIGS. 2-3, the FCC of FIGS. 2 and 4, and/or, more generally, the example aircraft roll operation control system of FIG. 2 to invoke an example normal control mode.

FIG. 11 is a flowchart representative of example machine readable instructions 1100 that may be executed to implement the SCE controller 140 of FIGS. 1, 2, and/or 3, the FCC 142A-B of FIGS. 1, 2, and/or 4, and/or, more generally, the aircraft roll operation control system 200 of FIG. 2 to invoke normal control mode. The machine readable instructions 1100 of FIG. 11 may be executed to implement block 912 of the machine readable instructions 900 of FIG. 9. The machine readable instructions 1100 of FIG. 11 begin at block 1102, at which the SCE controller 140 determines the control wheel position based on the pilot inputs. For example, the control wheel position determiner 320 of FIG. 3 receives the control wheel position measurements from the SCE sensor interface 310 and determines the angular position of the control wheel(s) 202, 204.

At block 1104, in response to the FCC 142A-B determining that autopilot is not engaged, the pilot inputs control the body run cable 240 that actuates the aileron actuators 230, 232. The displacement of the body run cable 240 actuates that aileron actuators 230, 232 and, in turn, controls the ailerons 120, 122.

At block 1106, the SCE controller 140 invokes the spoiler actuators 226A-D, 228A-D to control the spoilers 124A-D, 126A-D based on the control wheel position. For example, the spoiler controller 330 of FIG. 3 invokes the spoiler actuators 226A-D, 228A-D based on the position of the control wheels 202, 204 to generate commands to control the spoilers 124A-D, 126A-D.

Figure 12:
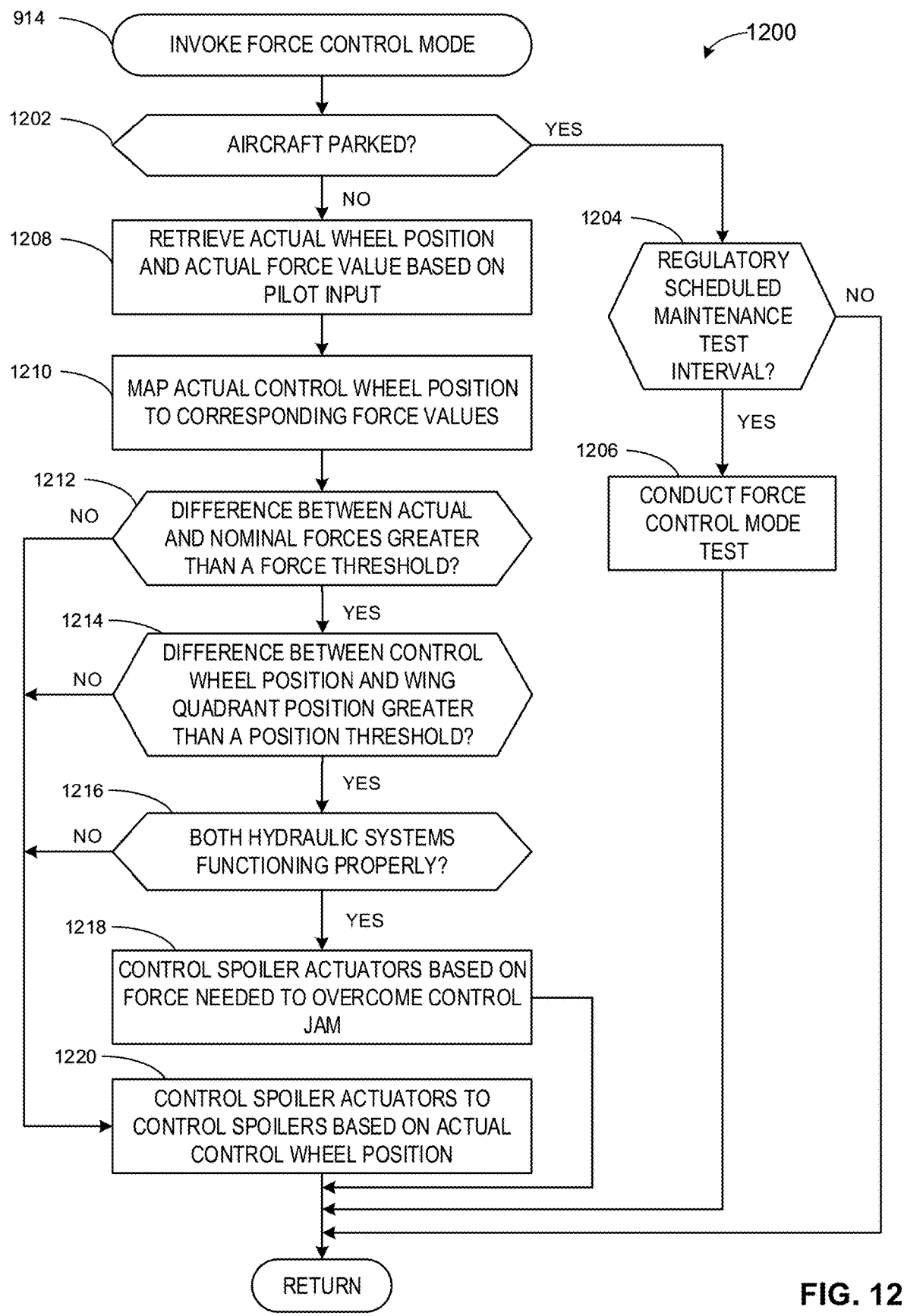
FIG. 12 is a flowchart representative of example machine readable instructions that may be executed to implement the SCE controller of FIGS. 2-3, the FCC of FIGS. 2 and 4, and/or, more generally, the example aircraft roll operation control system of FIG. 2 to invoke an example force control mode.

FIG. 12 is a flowchart representative of example machine readable instructions 1200 that may be executed to implement the SCE controller 140 of FIGS. 1, 2, and/or 3, the FCC 142A-B of FIGS. 1, 2, and/or 4, and/or, more generally, the aircraft roll operation control system 200 of FIG. 2 to invoke force control mode. The machine readable instructions 1200 of FIG. 12 may be executed to implement block 914 of the machine readable instructions 900 of FIG. 9. The machine readable instructions 1200 of FIG. 12 begin at block 1202, at which the FCC 142A-B determines whether the aircraft is parked. For example, the flight parameter determiner 420 (FIG. 4) can determine that the aircraft 100 is parked based on the flight parameter data 450 as previously mentioned in connection with block 916 of FIG. 9.

If, at block 1202, the flight parameter determiner 420 determines that the aircraft is parked, then, at block 1204, the SCE controller 140 and/or the FCC 142A-B determines whether a regulatory maintenance test is to be conducted. For example, the spoiler controller 330 retrieves a maintenance schedule from the SCE database 350 and determines if a maintenance test has been conducted within a particular maintenance interval. In such examples, the maintenance interval is a time period that a regulatory maintenance test is to be conducted.

If, at block 1204, the spoiler controller 330 determines that a regulatory maintenance test is to be conducted, then, at block 1206, the spoiler controller 330 conducts a force control mode maintenance test. If, at block 1204, the spoiler controller 330 determines that a regulatory maintenance test has been conducted within the maintenance interval, then, the instructions of FIG. 12 return control to the instructions of FIG. 9.

If, at block 1202, the flight parameter determiner 420 determines that the aircraft is not parked, then, at block 1208, the SCE controller 140 and/or the FCC 142A-B retrieve the actual control wheel position 708 and the actual force value 712 based on pilot input(s). For example, the spoiler controller 330 retrieves the actual control wheel position 708 from the control wheel position determiner 320 and the actual force value 712 from the control wheel force determiner 410.

At block 1210, the SCE controller 140 maps the actual control wheel position to the corresponding nominal force value 710, corresponding to the nominal response 702, and the maximum allowable force value 716, corresponding to the maximum allowable response 706. For example, the spoiler controller 330 uses the actual control wheel position 708 to determine the nominal force value 710 and the maximum allowable force value 716 to use in further comparison calculations. In such examples, the nominal force value 710 and the maximum allowable force value 716 are retrieved from the SCE database 350 and mapped from a look-up table containing the nominal response 702 and maximum allowable response 706.

At block 1212, the SCE controller 140 determines whether the difference between the actual force value 712 and the nominal force value 710 is greater than a force threshold. For example, the spoiler controller 330 calculates the first difference 714 and second difference 718 of FIG. 7 and uses the second difference 718 as the force threshold. Herein, the second difference 718 may be referred to as the force threshold 718. If, at block 1212, the spoiler controller 330 determines that the first difference 714 is less than or equal to the force threshold 718, then, at block 1220, the SCE controller 140 controls the spoiler actuators 226A-D, 228A-D based on the actual control wheel position 708.

If, at block 1212, the spoiler controller 330 determines that the first difference 714 is greater than the force threshold 718, then, at block 1214, the SCE controller 140 determines whether the difference between the control wheel position 708 and the wing quadrant position data is greater than a position threshold. For example, the spoiler controller 330 retrieves wing quadrant position data and compares it to the control wheel position 708 to determine a third example difference. In such examples, the third difference is compared to the position threshold, where the position threshold is based on the aircraft roll operation control system 200 component configuration.

If, at block 1214, the spoiler controller 330 determines that the third difference is less than or equal to the position threshold, then, at block 1220, the SCE controller 140 controls the spoiler actuators 226A-D, 228A-D based on the actual control wheel position 708.

If, at block 1214, the spoiler controller 330 determines that the third difference is greater than the position threshold, then, at block 1216, the FCC 142A-B determines whether both hydraulic systems 218, 220 are functioning properly (e.g., contain proper amount of pressure). For example, the FCC sensor interface 405 of FIG. 4 receives pressure data from the pressure sensors 222, 224 and determines whether both hydraulic systems 218, 220 have an operable amount of pressure.

If, at block 1216, the FCC sensor interface 405 determines that both hydraulic systems 218, 220 are not functioning properly, then, at block 1220, the SCE controller 140 controls the spoiler actuators 226A-D, 228A-D based on the actual control wheel position 708.

If, at block 1216, the FCC sensor interface 405 determines that both hydraulic systems 218, 220 are functioning properly, then at block 1218, the SCE controller 140 controls the spoiler actuators 226A-D, 228A-D based on a force needed to overcome the mechanical control jam. For example, the spoiler controller 330 controls the spoiler actuators 226A-D, 228A-D based on a calculated force value rather than the control wheel position. In such examples, the calculated force value is based on the difference between the first difference 714 and the force threshold 718. For instance, the calculated force will depend on how much greater the first difference 714 is than the force threshold 718.

At block 1220, the SCE controller 140 controls the spoiler actuators 226A-D, 228A-D based on the actual control wheel position 708. For example, the spoiler controller 330, generates commands based on the actual control wheel position 708 to control the spoiler actuators 226A-D, 228A-D that, in turn, control the spoilers 124A-D, 126A-D.

Figure 13:
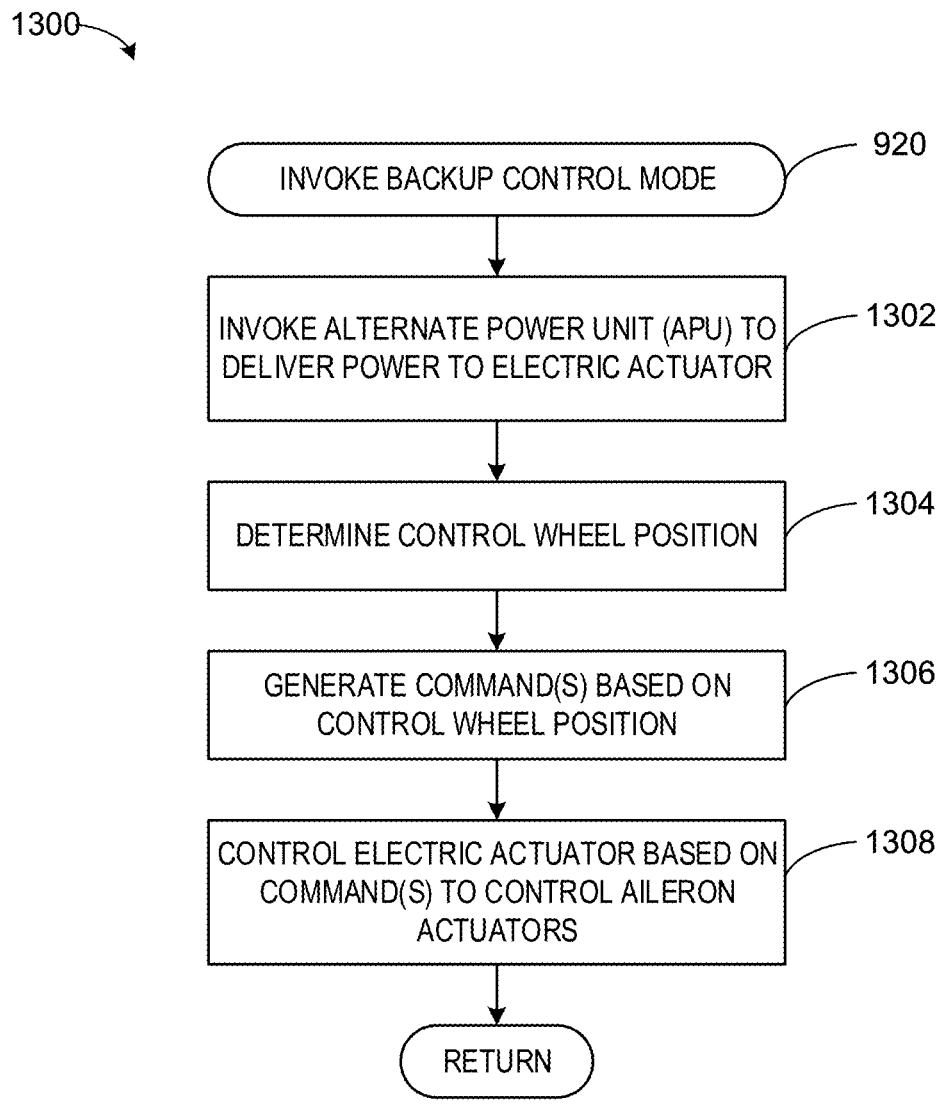
FIG. 13 is a flowchart representative of example machine readable instructions that may be executed to implement the SCE controller of FIGS. 2-3, the FCC of FIGS. 2 and 4, and/or, more generally, the example aircraft roll operation control system of FIG. 2 to invoke an example backup control mode.

FIG. 13 is a flowchart representative of example machine readable instructions 1300 that may be executed to implement the SCE controller 140 of FIGS. 1, 2, and/or 3, the FCC 142A-B of FIGS. 1, 2, and/or 4, and/or, more generally, the aircraft roll operation control system 200 of FIG. 2 to invoke backup control mode. The machine readable instructions 1300 of FIG. 13 may be executed to implement block 920 of the machine readable instructions 900 of FIG. 9. The machine readable instructions 1300 of FIG. 13 begin at block 1302, at which the SCE controller 140 invokes the APU 144 to deliver power to the electric actuator 238. For example, the backup controller 340, in response to both hydraulic systems 218, 220 malfunctioning, invokes the APU 144 to power the electric actuators 238.

At block 1304, the SCE controller 140 determines the control wheel position 708. For example, the backup controller 340 retrieves the control wheel position 708 from the control wheel position determiner 320. At block 1306, the backup controller 340 generates flight commands based on the control wheel position 708 to be used to control the ailerons 120, 122. At block 1308, the backup controller 340 controls the electric actuator 238 based on the generated commands to control the aileron actuators 230, 232, to, in turn, control the aileron 120, 122. Advantageously, by using an electric actuator to control the ailerons 120, 122, the aircraft roll operation control system 200 can still perform roll operations when both hydraulic systems 218, 220 are not functioning properly.

Figure 14:
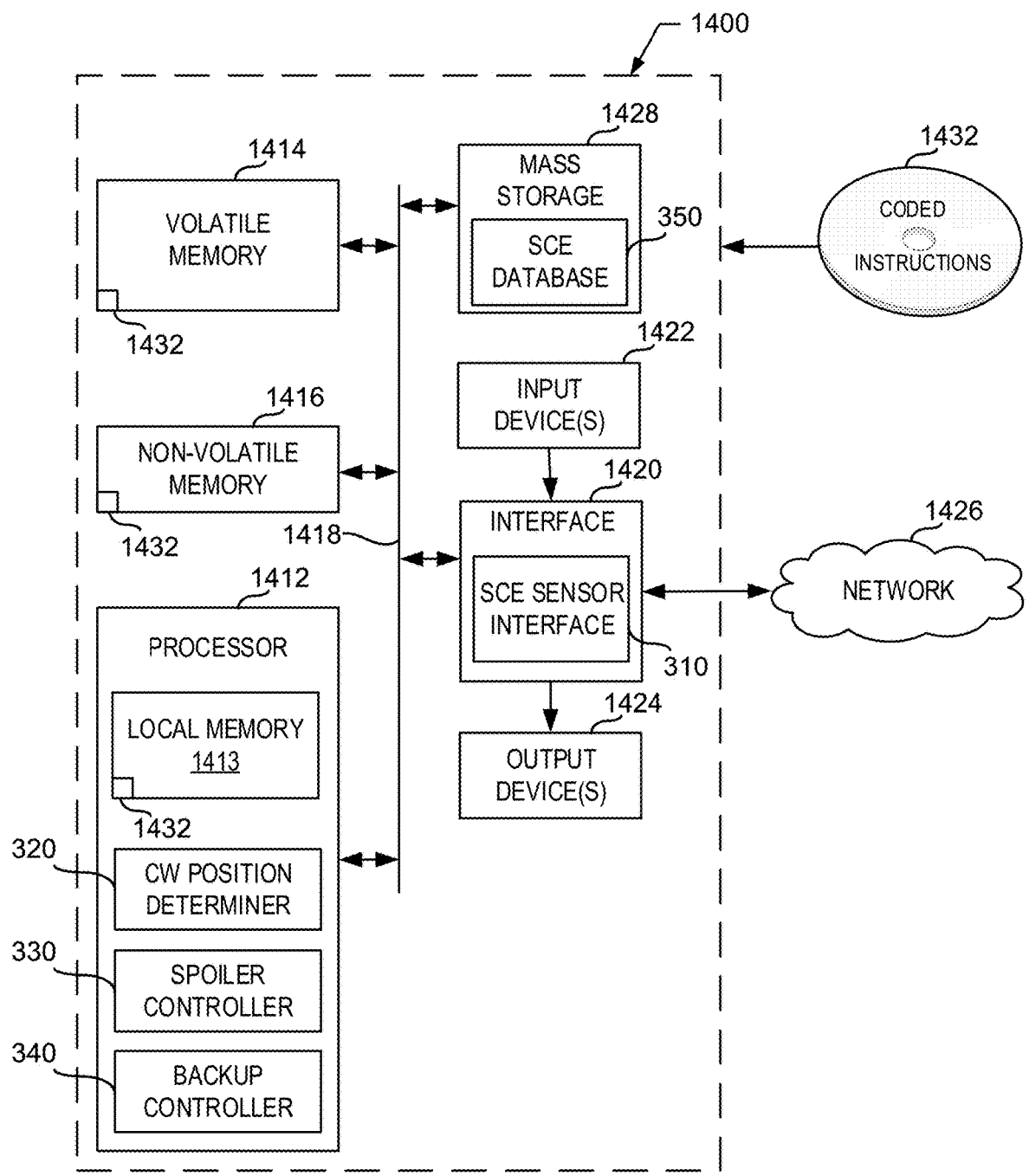
FIG. 14 is a block diagram of an example processing platform structured to execute the example machine readable instructions of FIGS. 9, 10, 11, 12, and/or 13 to implement the SCE controller of FIGS. 2-3.

FIG. 14 is a block diagram of an example processor platform 1400 structured to execute the instructions of FIGS. 9-13 to implement the SCE controller 140 of FIGS. 1, 2, and/or 3. The processor platform 1400 can be, for example, a server, an aircraft computer, an industrial computer, a remote electronic unit (REU), or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1412 implements the example control wheel position determiner 320, the example spoiler controller 330, and the example backup controller 340 of FIG. 3.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by SDRAM, DRAM, RDRAM®, and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device (s) 1422 permit(s) a user to enter data and/or commands into the processor 1412. The input device(s) 1422 can be implemented by, for example, an audio sensor, a microphone, a camera (still or video), a keyboard, a button, a touchscreen, and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1420 of the illustrated example, thus, typically includes a graphics driver card, a graphics driver chip, and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 1420 implements the example SCE sensor interface 310 of FIG. 3.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and DVD drives. In this example, the one or more mass storage devices 1428 implement the example SCE database 350 of FIG. 3.

The machine executable instructions 1432 of FIGS. 9-13 may be stored in the mass storage device 1428, in the volatile memory 1414, in the non-volatile memory 1416, and/or on a removable non-transitory computer readable storage medium such as a CD or DVD.

Figure 15:
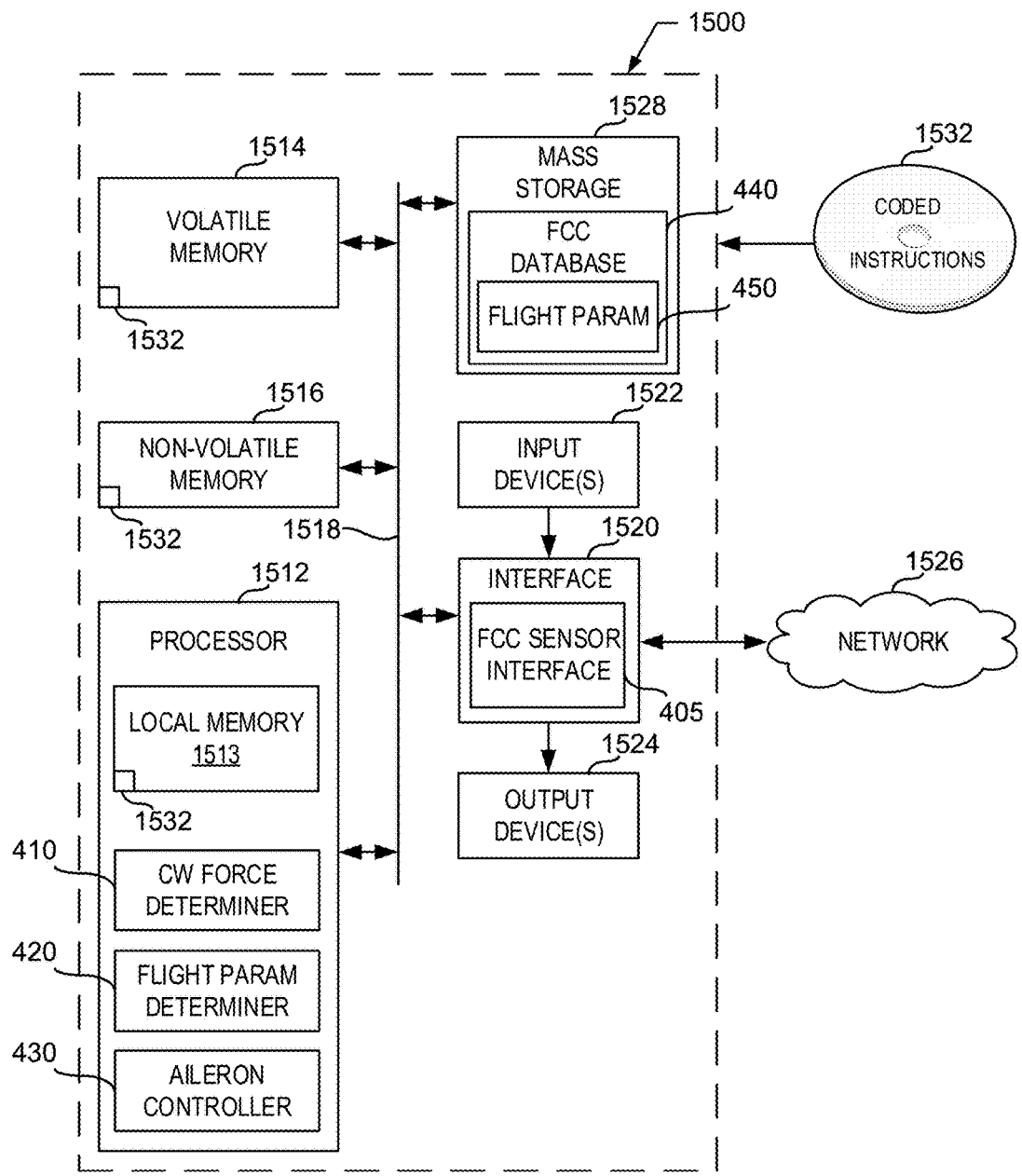
FIG. 15 is a block diagram of an example processing platform structured to execute the example machine readable instructions of FIGS. 9, 10, 11, 12, and/or 13 to implement the FCC of FIGS. 2 and 4.

FIG. 15 is a block diagram of an example processor platform 1500 structured to execute the instructions of FIGS. 9-13 to implement the FCC 142A-B of FIGS. 1, 2, and/or 4. The processor platform 1500 can be, for example, a server, an aircraft computer, an industrial computer, a remote electronic unit (REU), or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1512 implements the example control wheel force determiner 410, the example flight parameter determiner 420, and the example aileron controller 430 of FIG. 4.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by SDRAM, DRAM, RDRAM®, and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a USB, a Bluetooth® interface, a NFC interface, and/or a PCI express interface.

In the illustrated example, one or more input devices 1522 are connected to the interface circuit 1520. The input device(s) 1522 permit(s) a user to enter data and/or commands into the processor 1512. The input device(s) 1522 can be implemented by, for example, an audio sensor, a microphone, a camera (still or video), a keyboard, a button, and/or a voice recognition system.

One or more output devices 1524 are also connected to the interface circuit 1520 of the illustrated example. The output devices 1524 can be implemented, for example, by display devices (e.g., a LED, an OLED, a LCD, a CRT, an IPS display, a touchscreen, etc.), a tactile output device, and/or speaker. The interface circuit 1520 of the illustrated example, thus, typically includes a graphics driver card, a graphics driver chip, and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a DSL connection, a telephone line connection, a coaxial cable system, a satellite system, a line-of-site wireless system, a cellular telephone system, etc. In this example, the interface circuit 1520 implements the example FCC sensor interface 405 of FIG. 4.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and DVD drives. In this example, the one or more mass storage devices 1528 implement the example FCC database 440 and the example flight parameters 450 of FIG. 4.

The machine executable instructions 1532 of FIGS. 9-13 may be stored in the mass storage device 1528, in the volatile memory 1514, in the non-volatile memory 1516, and/or on a removable non-transitory computer readable storage medium such as a CD or DVD.

From the foregoing, it will be appreciated that the above systems, methods, apparatus, and articles of manufacture control aircraft roll operations by counteracting a mechanical control jam or a non-responsive control system component. The example systems, methods, apparatus, and articles of manufacture can detect a mechanical control jam by determining deviations between an actual response and at least one of a nominal response or a maximum allowable response based on the aircraft components and/or configuration. The example systems, methods, apparatus, and articles of manufacture reduce a need for a physical jam override device to ensure that available operational controls (e.g., hydraulic, electric, and/or mechanical operational controls) can operate in the event of a mechanical control jam to operate the aircraft roll operation control system under flight conditions.

Example methods, apparatus, systems, and articles of manufacture to control aircraft roll operations are disclosed herein. Further examples and combinations thereof include the following:

Example 1 includes a system for controlling a roll operation of an aircraft, the system comprising a control wheel position determiner to determine a control wheel position based on an input from a control wheel of the aircraft, a control wheel force determiner to determine a first control wheel force based on a sensor measurement, and a spoiler controller to map the control wheel position to a second control wheel force, the second control wheel force based on nominal characteristics of the aircraft, determine a first difference between the first control wheel force and the second control wheel force, and in response to determining that the first difference does not satisfy a threshold, move a flight control surface based on a third control wheel force, the third control wheel force based on a second difference between the first difference and the threshold.

Example 2 includes the system of example 1, wherein the flight control surface is an aileron, and the spoiler controller is to move the aileron from a first position to a second position by in response to determining that the aircraft is in backup control mode, generating a flight command based on the control wheel position, controlling an electric actuator coupled to an aileron actuator based on the flight command, the aileron actuator coupled to a wing cable, and in response to controlling the aileron actuator, moving the aileron by controlling the wing cable coupled to the aileron.

Example 3 includes the system of example 1, wherein the flight control surface is an aileron, and further including an aileron controller to determine whether the aircraft is in normal control mode, and moving the aileron from a first position to a second position by in response to determining the aircraft is in the normal control mode, controlling a body run cable coupled to an aileron actuator, and in response to controlling the body run cable, controlling the aileron actuator based on control wheel inputs to control a wing cable coupled to the aileron and the aileron actuator.

Example 4 includes the system of example 1, wherein the flight control surface is a spoiler, and the spoiler controller is to move the spoiler from a first position to a second position by in response to determining that the aircraft is in normal control mode, generating a flight command based on the control wheel position, and controlling a spoiler actuator based on the flight command, the spoiler actuator coupled to the spoiler.

Example 5 includes the system of example 1, wherein the flight control surface is an aileron, and further including an aileron controller to move the aileron from a first position to a second position by in response to determining that the aircraft is in autopilot control mode, generating an autopilot flight command based on flight parameters associated with the aircraft, controlling an autopilot actuator coupled to an aileron actuator based on the autopilot flight command, the aileron actuator coupled to a wing cable, in response to controlling the aileron actuator, moving the aileron by controlling the wing cable coupled to the aileron, and in response to controlling the aileron actuator, rotating the control wheel based on a motion of a body run cable.

Example 6 includes the system of example 1, wherein the flight control surface is a spoiler, and the spoiler controller is to move the spoiler from a first position to a second position by in response to determining that the aircraft is in autopilot control mode, generating an autopilot flight command based on the control wheel position, the control wheel position based on a back-driven motion of a body run cable, and controlling a spoiler actuator coupled to the spoiler based on the control wheel position.

Example 7 includes the system of example 1, wherein the flight control surface is a spoiler, and the spoiler controller is to, in response to determining that the first difference does not satisfy the threshold, move the spoiler from a first position to a second position by generating a flight command based on the third control wheel force, and controlling a spoiler actuator coupled to the spoiler based on the flight command.

Example 8 includes a non-transitory computer readable storage medium comprising instructions that, when executed, cause at least one processor to at least determine a control wheel position based on an input from a control wheel of an aircraft, determine a first control wheel force based on a sensor measurement, map the control wheel position to a second control wheel force, the second control wheel force based on nominal characteristics of the aircraft, determine a first difference between the first control wheel force and the second control wheel force, and in response to determining that the first difference does not satisfy a threshold, move a flight control surface based on a third control wheel force, the third control wheel force based on a second difference between the first difference and the threshold.

Example 9 includes the non-transitory computer readable storage medium of example 8, wherein the flight control surface is an aileron, and the instructions, when executed, cause the at least one processor to in response to determining that the aircraft is in backup control mode, generate a flight command based on the control wheel position, control an electric actuator coupled to an aileron actuator based on the flight command, the aileron actuator coupled to a wing cable, and in response to controlling the aileron actuator, move the aileron by controlling the wing cable coupled to the aileron.

Example 10 includes the non-transitory computer readable storage medium of example 8, wherein the flight control surface is an aileron, and the instructions, when executed, cause the at least one processor to in response to determining the aircraft is in normal control mode, control a body run cable coupled to an aileron actuator, and in response to controlling the body run cable, control the aileron actuator based on control wheel inputs to control a wing cable coupled to the aileron and the aileron actuator.

Example 11 includes the non-transitory computer readable storage medium of example 8, wherein the flight control surface is a spoiler, and the instructions, when executed, cause the at least one processor to in response to determining that the aircraft is in normal control mode, generate a flight command based on the control wheel position, and control a spoiler actuator based on the flight command, the spoiler actuator coupled to the spoiler.

Example 12 includes the non-transitory computer readable storage medium of example 8, wherein the flight control surface is an aileron, and the instructions, when executed, cause the at least one processor to in response to determining that the aircraft is in autopilot control mode, generate an autopilot flight command based on flight parameters associated with the aircraft, control an autopilot actuator coupled to an aileron actuator based on the autopilot flight command, the aileron actuator coupled to a wing cable, in response to controlling the aileron actuator, move the aileron by controlling the wing cable coupled to the aileron, and in response to controlling the aileron actuator, rotate the control wheel based on a motion of a body run cable.

Example 13 includes the non-transitory computer readable storage medium of example 8, wherein the flight control surface is a spoiler, and the instructions, when executed, cause the at least one processor to in response to determining that the aircraft is in autopilot control mode, generate an autopilot flight command based on the control wheel position, the control wheel position based on a back-driven motion of a body run cable, and control a spoiler actuator coupled to the spoiler based on the control wheel position.

Example 14 includes the non-transitory computer readable storage medium of example 8, wherein the flight control surface is a spoiler and, in response to determining that the first difference does not satisfy the threshold, the instructions, when executed, cause the at least one processor to generate a flight command based on the third control wheel force, and control a spoiler actuator coupled to the spoiler based on the flight command.

Example 15 includes a method for controlling a roll operation of an aircraft, the method comprising determining a control wheel position based on an input from a control wheel of the aircraft, determining a first control wheel force based on a sensor measurement, mapping the control wheel position to a second control wheel force, the second control wheel force based on nominal characteristics of the aircraft, determining a first difference between the first control wheel force and the second control wheel force, and in response to determining that the first difference does not satisfy a threshold, moving a flight control surface based on a third control wheel force, the third control wheel force based on a second difference between the first difference and the threshold.

Example 16 includes the method of example 15, wherein the flight control surface is an aileron, and further including in response to determining that the aircraft is in backup control mode, generating a flight command based on the control wheel position, controlling an electric actuator coupled to an aileron actuator based on the flight command, the aileron actuator coupled to a wing cable, and in response to controlling the aileron actuator, moving the aileron by controlling the wing cable coupled to the aileron.

Example 17 includes the method of example 15, wherein the flight control surface is an aileron, and further including in response to determining the aircraft is in normal control mode, controlling a body run cable coupled to an aileron actuator, and in response to controlling the body run cable, controlling the aileron actuator based on control wheel inputs to control a wing cable coupled to the aileron and the aileron actuator.

Example 18 includes the method of example 15, wherein the flight control surface is a spoiler, and further including in response to determining that the aircraft is in normal control mode, generating a flight command based on the control wheel position, and controlling a spoiler actuator based on the flight command, the spoiler actuator coupled to the spoiler.

Example 19 includes the method of example 15, wherein the flight control surface is an aileron, and further including in response to determining that the aircraft is in autopilot control mode, generating an autopilot flight command based on flight parameters associated with the aircraft, controlling an autopilot actuator coupled to an aileron actuator based on the autopilot flight command, the aileron actuator coupled to a wing cable, in response to controlling the aileron actuator, moving the aileron by controlling the wing cable coupled to the aileron, and in response to controlling the aileron actuator, rotating the control wheel based on a motion of a body run cable.

Example 20 includes the method of example 15, wherein the flight control surface is a spoiler, and further including in response to determining that the aircraft is in autopilot control mode, generating an autopilot flight command based on the control wheel position, the control wheel position based on a back-driven motion of a body run cable, and controlling a spoiler actuator coupled to the spoiler based on the control wheel position.

Example 21 includes the method of example 15, wherein the flight control surface is a spoiler and, further including in response to determining that the first difference does not satisfy the threshold generating a flight command based on the third control wheel force, and controlling a spoiler actuator coupled to the spoiler based on the flight command.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system for controlling a roll operation of an aircraft, the system comprising:
   a control wheel position determiner to determine a control wheel position based on an input from a control wheel of the aircraft;
   a control wheel force determiner to determine a first control wheel force based on a sensor measurement; and
   a spoiler controller to:
      map the control wheel position to a second control wheel force, the second control wheel force based on nominal characteristics of the aircraft;
      determine a first difference between the first control wheel force and the second control wheel force; and
      in response to determining that the first difference does not satisfy a threshold, move a flight control surface based on a third control wheel force, the third control wheel force based on a second difference between the first difference and the threshold.

2. The system of claim 1, wherein the flight control surface is an aileron, and the spoiler controller is to move the aileron from a first position to a second position by:
   in response to determining that the aircraft is in backup control mode, generating a flight command based on the control wheel position;
   controlling an electric actuator coupled to an aileron actuator based on the flight command, the aileron actuator coupled to a wing cable; and
   in response to controlling the aileron actuator, moving the aileron by controlling the wing cable coupled to the aileron.

3. The system of claim 1, wherein the flight control surface is an aileron, and further including an aileron controller to determine whether the aircraft is in normal control mode, and moving the aileron from a first position to a second position by:
   in response to determining the aircraft is in the normal control mode, controlling a body run cable coupled to an aileron actuator; and in response to controlling the body run cable, controlling the aileron actuator based on control wheel inputs to control a wing cable coupled to the aileron and the aileron actuator.

4. The system of claim 1, wherein the flight control surface is a spoiler, and the spoiler controller is to move the spoiler from a first position to a second position by:
   in response to determining that the aircraft is in normal control mode, generating a flight command based on the control wheel position; and
   controlling a spoiler actuator based on the flight command, the spoiler actuator coupled to the spoiler.

5. The system of claim 1, wherein the flight control surface is an aileron, and further including an aileron controller to move the aileron from a first position to a second position by:
   in response to determining that the aircraft is in autopilot control mode, generating an autopilot flight command based on flight parameters associated with the aircraft;
   controlling an autopilot actuator coupled to an aileron actuator based on the autopilot flight command, the aileron actuator coupled to a wing cable;
   in response to controlling the aileron actuator, moving the aileron by controlling the wing cable coupled to the aileron; and
   in response to controlling the aileron actuator, rotating the control wheel based on a motion of a body run cable.

6. The system of claim 1, wherein the flight control surface is a spoiler, and the spoiler controller is to move the spoiler from a first position to a second position by:
   in response to determining that the aircraft is in autopilot control mode, generating an autopilot flight command based on the control wheel position, the control wheel position based on a back-driven motion of a body run cable; and
   controlling a spoiler actuator coupled to the spoiler based on the control wheel position.

7. The system of claim 1, wherein the flight control surface is a spoiler, and the spoiler controller is to, in response to determining that the first difference does not satisfy the threshold, move the spoiler from a first position to a second position by:
   generating a flight command based on the third control wheel force; and
   controlling a spoiler actuator coupled to the spoiler based on the flight command.

8. A non-transitory computer readable storage medium comprising instructions that, when executed, cause at least one processor to at least:
   determine a control wheel position based on an input from a control wheel of an aircraft;
   determine a first control wheel force based on a sensor measurement;
   map the control wheel position to a second control wheel force, the second control wheel force based on nominal characteristics of the aircraft;
   determine a first difference between the first control wheel force and the second control wheel force; and
   in response to determining that the first difference does not satisfy a threshold, move a flight control surface based on a third control wheel force, the third control wheel force based on a second difference between the first difference and the threshold.

9. The non-transitory computer readable storage medium of claim 8, wherein the flight control surface is an aileron, and the instructions, when executed, cause the at least one processor to:
   in response to determining that the aircraft is in backup control mode, generate a flight command based on the control wheel position;
   control an electric actuator coupled to an aileron actuator based on the flight command, the aileron actuator coupled to a wing cable; and
   in response to controlling the aileron actuator, move the aileron by controlling the wing cable coupled to the aileron.

10. The non-transitory computer readable storage medium of claim 8, wherein the flight control surface is an aileron, and the instructions, when executed, cause the at least one processor to:
    in response to determining the aircraft is in normal control mode, control a body run cable coupled to an aileron actuator; and
    in response to controlling the body run cable, control the aileron actuator based on control wheel inputs to control a wing cable coupled to the aileron and the aileron actuator.

11. The non-transitory computer readable storage medium of claim 8, wherein the flight control surface is a spoiler, and the instructions, when executed, cause the at least one processor to:
    in response to determining that the aircraft is in normal control mode, generate a flight command based on the control wheel position; and
    control a spoiler actuator based on the flight command, the spoiler actuator coupled to the spoiler.

12. The non-transitory computer readable storage medium of claim 8, wherein the flight control surface is an aileron, and the instructions, when executed, cause the at least one processor to:
    in response to determining that the aircraft is in autopilot control mode, generate an autopilot flight command based on flight parameters associated with the aircraft;
    control an autopilot actuator coupled to an aileron actuator based on the autopilot flight command, the aileron actuator coupled to a wing cable;
    in response to controlling the aileron actuator, move the aileron by controlling the wing cable coupled to the aileron; and
    in response to controlling the aileron actuator, rotate the control wheel based on a motion of a body run cable.

13. The non-transitory computer readable storage medium of claim 8, wherein the flight control surface is a spoiler, and the instructions, when executed, cause the at least one processor to:
    in response to determining that the aircraft is in autopilot control mode, generate an autopilot flight command based on the control wheel position, the control wheel position based on a back-driven motion of a body run cable; and
    control a spoiler actuator coupled to the spoiler based on the control wheel position.

14. The non-transitory computer readable storage medium of claim 8, wherein the flight control surface is a spoiler and, in response to determining that the first difference does not satisfy the threshold, the instructions, when executed, cause the at least one processor to:
    generate a flight command based on the third control wheel force; and
    control a spoiler actuator coupled to the spoiler based on the flight command.

15. A method for controlling a roll operation of an aircraft, the method comprising:
- determining a control wheel position based on an input from a control wheel of the aircraft;
- determining a first control wheel force based on a sensor measurement;
- mapping the control wheel position to a second control wheel force, the second control wheel force based on nominal characteristics of the aircraft;
- determining a first difference between the first control wheel force and the second control wheel force; and
- in response to determining that the first difference does not satisfy a threshold, moving a flight control surface based on a third control wheel force, the third control wheel force based on a second difference between the first difference and the threshold.

16. The method of claim 15, wherein the flight control surface is an aileron, and further including:
- in response to determining that the aircraft is in backup control mode, generating a flight command based on the control wheel position;
- controlling an electric actuator coupled to an aileron actuator based on the flight command, the aileron actuator coupled to a wing cable; and
- in response to controlling the aileron actuator, moving the aileron by controlling the wing cable coupled to the aileron.

17. The method of claim 15, wherein the flight control surface is an aileron, and further including:
- in response to determining the aircraft is in normal control mode, controlling a body run cable coupled to an aileron actuator; and
- in response to controlling the body run cable, controlling the aileron actuator based on control wheel inputs to control a wing cable coupled to the aileron and the aileron actuator.

18. The method of claim 15, wherein the flight control surface is a spoiler, and further including:
- in response to determining that the aircraft is in normal control mode, generating a flight command based on the control wheel position; and
- controlling a spoiler actuator based on the flight command, the spoiler actuator coupled to the spoiler.

19. The method of claim 15, wherein the flight control surface is an aileron, and further including:
- in response to determining that the aircraft is in autopilot control mode, generating an autopilot flight command based on flight parameters associated with the aircraft;
- controlling an autopilot actuator coupled to an aileron actuator based on the autopilot flight command, the aileron actuator coupled to a wing cable;
- in response to controlling the aileron actuator, moving the aileron by controlling the wing cable coupled to the aileron; and
- in response to controlling the aileron actuator, rotating the control wheel based on a motion of a body run cable.

20. The method of claim 15, wherein the flight control surface is a spoiler, and further including:
- in response to determining that the aircraft is in autopilot control mode, generating an autopilot flight command based on the control wheel position, the control wheel position based on a back-driven motion of a body run cable; and
- controlling a spoiler actuator coupled to the spoiler based on the control wheel position.

21. The method of claim 15, wherein the flight control surface is a spoiler and, further including:
- in response to determining that the first difference does not satisfy the threshold:
- generating a flight command based on the third control wheel force; and
- controlling a spoiler actuator coupled to the spoiler based on the flight command.

* * * * *